United States Patent
Ozaki

(10) Patent No.: US 8,019,220 B2
(45) Date of Patent: Sep. 13, 2011

(54) PON SYSTEM, STATION SIDE DEVICE AND REDUNDANT METHOD USED FOR THE SAME

(75) Inventor: Hirokazu Ozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1044 days.

(21) Appl. No.: 11/808,219

(22) Filed: Jun. 7, 2007

(65) Prior Publication Data

US 2008/0025724 A1    Jan. 31, 2008

(30) Foreign Application Priority Data

Jul. 26, 2006   (JP) ................................ 2006-202658
Feb. 28, 2007   (JP) ................................ 2006-048275

(51) Int. Cl.
*H04J 14/00* (2006.01)
(52) U.S. Cl. ................................ 398/66; 398/68; 398/71
(58) Field of Classification Search .............. 398/66–68, 398/71, 69, 70, 7, 5, 2, 72, 4
See application file for complete search history.

(56) References Cited

U.S. PATENT DOCUMENTS

| | | | | |
|---|---|---|---|---|
| 6,975,586 B1 * | 12/2005 | Yoshimura | ..................... | 370/217 |
| 2002/0071149 A1 * | 6/2002 | Xu et al. | ........................ | 359/110 |
| 2006/0165412 A1 * | 7/2006 | Jung et al. | ........................ | 398/71 |

FOREIGN PATENT DOCUMENTS

| | | |
|---|---|---|
| JP | 2000-349799 | 12/2000 |
| JP | 2001-119345 | 4/2001 |
| WO | WO 2006/115536 A2 * | 11/2006 |

* cited by examiner

*Primary Examiner* — M. R. Sedighian
(74) *Attorney, Agent, or Firm* — McGinn IP Law Group, PLLC

(57) ABSTRACT

The present invention provides a PON system including a plurality of PONs (passive optical network), a plurality of house devices set in an end user's house, and a station side device including a plurality of PON interface sections connected to the house devices via the plurality of PONs, and a concentrating/distributing section for accommodating the plurality of PONs and concentrating and distributing signals via the plurality of PON interface sections; wherein
the station side device has N (N is a positive integer) optical switch modules, each of which is connected to a PON interface section for current use among the plurality of PONs; and
realizes 1:N redundant of the PONs by cascading the N optical switch modules.

10 Claims, 40 Drawing Sheets

FIG. 14

WHERE SWITCHING REQUESTS ARE SEQUENTIALLY GENERATED

| DETERMINATION ORDER | | |
|---|---|---|
| FIRST | SECOND | THIRD |
| PRIORITY OF REQUESTS | PRIORITY OF PON CARDS | PRIORITY OF PROCESSES |
| HIGH | HIGH | FIRST COME, FIRST SERVED |
| HIGH | LOW | FIRST COME, FIRST SERVED |
| LOW | HIGH | FIRST COME, FIRST SERVED |
| LOW | LOW | FIRST COME, FIRST SERVED |

FIG. 15

WHERE SWITCHING REQUESTS ARE GENERATED AT THE SAME TIME

| DETERMINATION ORDER | | |
|---|---|---|
| FIRST | SECOND | THIRD |
| PRIORITY OF REQUESTS | PRIORITY OF PON CARDS | PRIORITY OF PROCESSES |
| HIGH | HIGH | LOWER NUMBER |
| HIGH | HIGH | HIGHER NUMBER |
| HIGH | LOW | LOWER NUMBER |
| HIGH | LOW | HIGHER NUMBER |
| LOW | HIGH | LOWER NUMBER |
| LOW | HIGH | HIGHER NUMBER |
| LOW | LOW | LOWER NUMBER |
| LOW | LOW | HIGHER NUMBER |

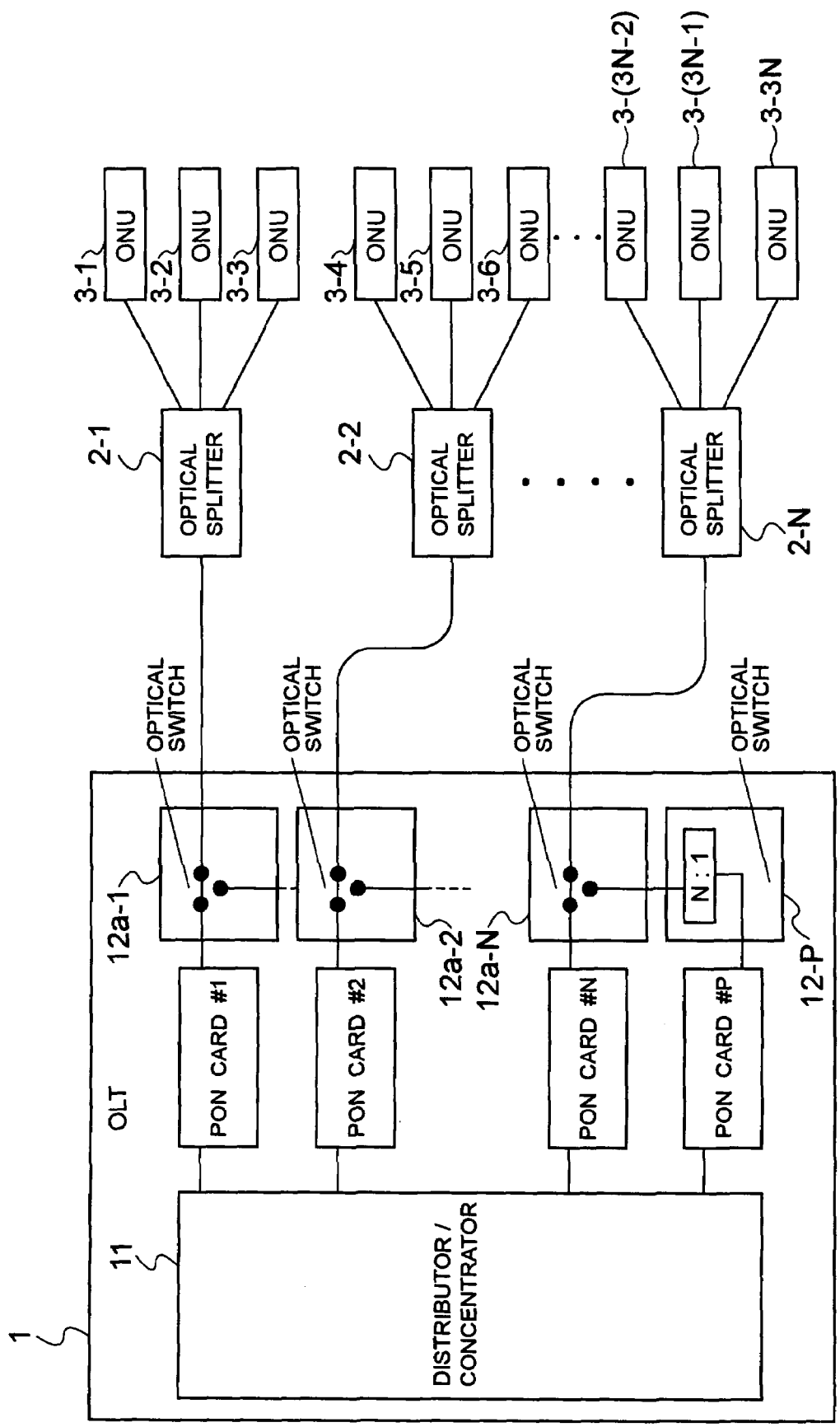

US 8,019,220 B2

PON SYSTEM, STATION SIDE DEVICE AND REDUNDANT METHOD USED FOR THE SAME

INCORPORATION BY REFERENCE

This application is based upon and claims the benefit of priority from Japanese patent applications No. 2006-202658, filed on Jul. 26, 2006, and No. 2007-048275, filed on Feb. 28, 2007, the disclosure of which is incorporated herein its entirety by reference.

BACKGROUND OF THE INVENTION

1. Field of the Invention

The present invention relates to a PON system, a station side device and a redundant method used for the same, and specifically to a redundant method in a PON (passive optical network) system.

2. Description of the Related Art

As the Internet has become so popular in these days, it has been drawn attention to change over the conventional types of access line to broadband access lines. Various types of access line including the ADSL (asymmetric digital subscriber line), a cable modem and the like have been adopted for a broadband access line. Now, the PON (passive optical network) has drawn attention as an approach to widen the band. It is the worldwide trend to transfer to the PON. These days, the PON system with giga-bits of the Interface speed has been come into use.

The basic configuration of the PON system is shown in FIG. 37 and FIG. 38. In FIG. 37 and FIG. 38, ONUs (optical network unit: house device) 61 to 63 are set in end user's houses, and an OLT (optical line terminator: station device) 4 is set in a station. The ONUs 61 to 63 and the OLT 4 are connected via an optical fiber and an optical splitter: optical branching/coupling device 5.

A personal computer (hereinafter referred to as a PC) at each end user's house is connected via each of the ONUs 61 to 63 to the network, and further connected to the upper level networks and the Internet via the OLT4. The wavelength of uplink signals (generally, with the wavelength of 1.3 μm) and the wavelength of downlink signals (generally, with the wavelength of 1.5 μm) are multiplexed. The OLT4 and the ONUs 61 to 63 are connected via an optical fiber.

The downlink signals are broadcasted from the OLT 4 to all the ONUs 61 to 63. Each of the ONUs 61 to 63 checks the destination of each frame and takes the frame destined to the self unit (see FIG. 37).

The uplink signals from each ONUs 61 to 63 converge at an optical splitter 5. Here, time division multiplexing is adopted to avoid signal collisions. Thus, the OLT 4 arbitrates an output request (REPORT) momently reported from each of the ONUs 61 to 63, calculates a transmitting time based on a distance between the OLT 4 and each of the ONUs 61 to 63, and then grants a permission to sending out the signals (GATE) to each of the ONUs 61 to 63 (see FIG. 38).

The output request (REPORT) includes a state of a queue in the buffer (the length of the queue) as information. The permission to sending out the signals (GATE) includes a time to start sending out the signals and a duration of sending out the signals for each priority of the signal. The ONUs 61 to 63 send out the uplink signals according to the GATE. That is, the uplink band allocation is realized by timeslot allocation.

FIG. 37 and FIG. 38 show a flow of signals where the OLT 4 accommodates one PON, with three ONUs 61 to 63 being connected to it. FIG. 37 shows the downlink signals and FIG. 38 shows the uplink signals. In FIG. 37 and FIG. 38, each number in a box indicates a frame of signals destined to each of the ONUs 61 to 63 and originated from each of the ONUs 61 to 63. Distances between the OLT 4 and respective ONUs 61 to 63 differ. The OLT 4 needs to measure a time for the signals to shuttle between itself and each of the ONUs 61 to 63 in advance when it starts up in order to grand an appropriate permission to sending out signals to each of the ONUs 61 to 63. That measurement is called the PON startup process.

The OLT 4, which is a station side device of the PON, generally has a plurality of PONs with functions of concentrating and distributing signals. That is, as shown in FIG. 39, the OLT 7 has a plurality of PON cards (PON interface section) #1 to #N+1 and a distributor/concentrator 71.

Each of the PON cards #1 to #N+1 has a function of inputting/outputting the PON, a function of terminating a signal, a function of interfacing internal device and the like. The distributor/concentrator 71 has a function of concentrating/distributing signals as well as a function of inputting/outputting interface with the next stage device. The OLT 7 shown in FIG. 39 has N+1 PON cards #1 to N+1, with each of the PONs being connected with three ONUs 9-1 to 9-3 N+3.

For the purpose of making a PON redundant to improve reliability of the system, an approach to duplex a PON is proposed (for example, see Japanese Patent Laid-Open No. 2000-349799 and Japanese Patent Laid-Open No. 2001-119345). An example of a configuration to duplex a PON is shown in FIG. 40 and FIG. 41. In the figures, two PON cards #0 and #1 are prepared for connecting the ONUs to a PON network via optical splitters 82 and 83.

FIG. 40 shows a configuration with the optical splitters 82 and 83 being set outside the OLT 80.

FIG. 41 shows a configuration with the optical splitter 92 being included in the OLT 90. In either case, the uplink signal on the PON network is branched into two to be input into two PON cards #0 and #1. The downlink signal is output from either of the two PON cards #0 and #1 to be sent onto the PON network.

The above-mentioned redundant method in a conventional PON system has a simple configuration to be realized easily, however, it needs to prepare two PON cards #0 and #1 at the side of the OLTs 80 and 90 for one PON network. That causes a drawback of increasing volumes of the OLTs 80 and 90 as well as their costs. With the volumes and costs being kept as they are, accommodating efficiency of each of the OLTs 80 and 90 degrades to half.

In the example shown in FIG. 39, half of the PON cards #1 to #N+1 is allocated to current use with the rest left as standby. In that example, the uplink signal is branched into two so that the power of light input into a PON card is reduced to half.

As a result, the example also has a restriction to further limit a distance between the OLT 7 and each of the ONUs 9-1 to 9-3 N+3 (i.e., the distance needs to be shorten), compared to a case where no redundant is taken.

Then, the object of the present invention is to provide a PON system, a station side device and a redundant method used for the same for solving the above-mentioned problems and realizing an economical and highly reliable system.

BRIEF SUMMARY OF THE INVENTION

An exemplary aspect of the invention is a PON system including a plurality of PONs (passive optical network), a plurality of house devices set in an end user's house, and a station side device including a plurality of PON interface sections connected to the house devices via the plurality of PONs, and a concentrating/distributing section for accommodating the plurality of PONs and concentrating and distributing signals via the plurality of PON interface sections; wherein the station side device has N (N is a positive integer) optical switch modules, each of which is connected to a PON interface section for current use among the plurality of PONs; and realizes 1:N redundant of the PONs by cascading the N optical switch modules.

BRIEF DESCRIPTION OF THE DRAWINGS

FIG. 14 is a diagram showing an example of a table configuration used in prioritizing when a switching request is generated in the PON card for current use;

FIG. 15 is a diagram showing an example of a table configuration used in prioritizing when a switching request is generated in the PON card for current use;

FIG. 16 is a block diagram showing an example of a configuration of a PON system according to the second exemplary embodiment of the present invention;

DETAILED DESCRIPTION OF THE EXEMPLARY EMBODIMENTS

Exemplary embodiments of the present invention will be described below with reference to the drawings.

Exemplary Embodiment 1

Figure 1:
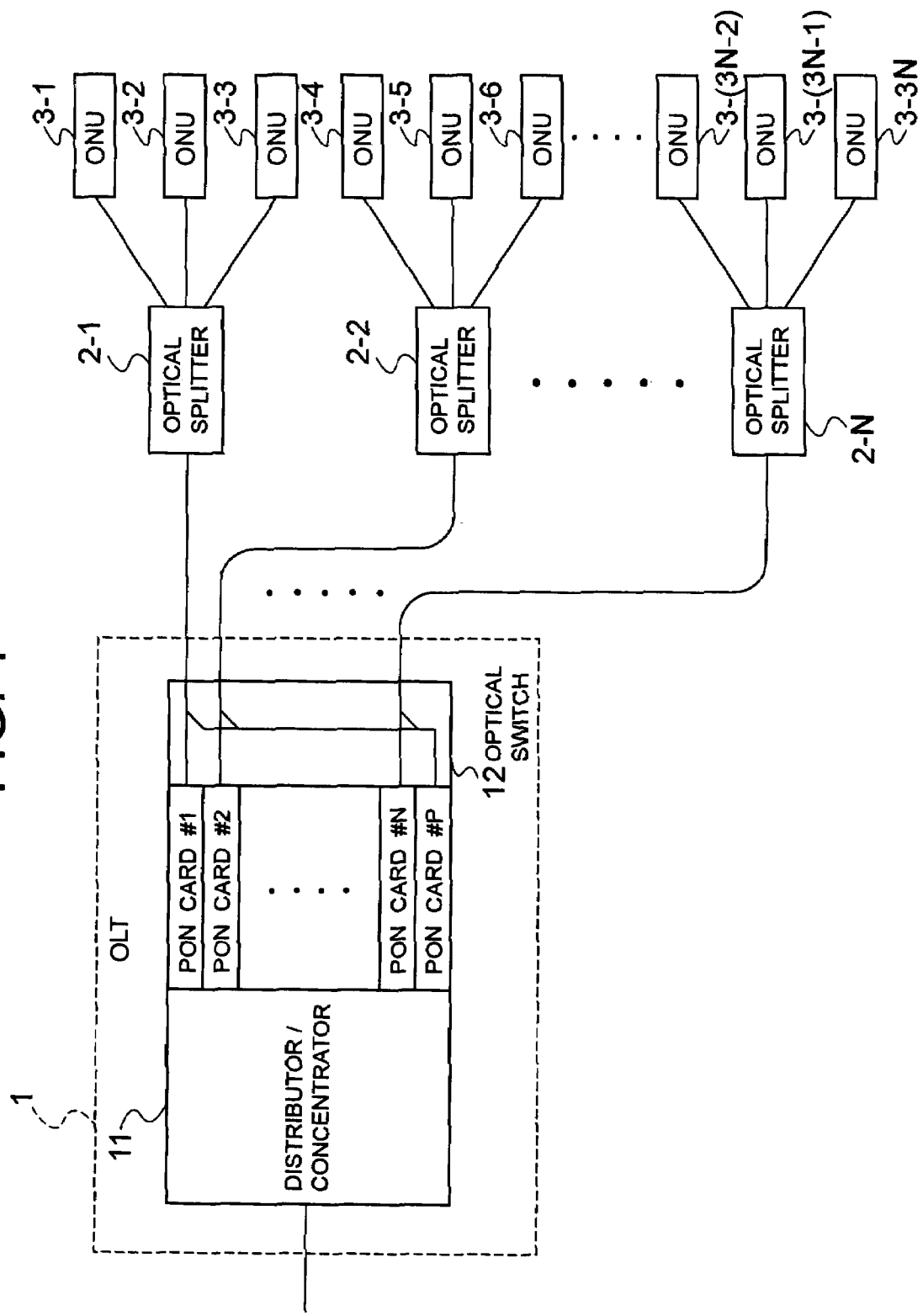
FIG. 1 is a block diagram showing a configuration of a PON system according to a first exemplary embodiment of the present invention.

FIG. 1 is a block diagram showing a configuration of a PON (passive optical network) system according to a first exemplary embodiment of the present invention. In FIG. 1, the PON system according to the first exemplary embodiment of the present invention realizes a 1:N redundant configuration of an OLT (optical line terminator: station device) by allocating a PON card (PON interface section) #P to a standby and connecting any one of N (N is a positive integer) PON network (corresponding to N PON cards #1 to #N) to the standby via an optical switch 12.

Here, the PON network refers to an optical network outside the OLT 1, i.e., the whole of an optical fiber, an optical splitter (an optical branch/combining device) 2-1 to 2-N, and ONUs (optical network unit: house device) 3-1 to 3-3N, which are subsequently connected to them.

Figure 2:
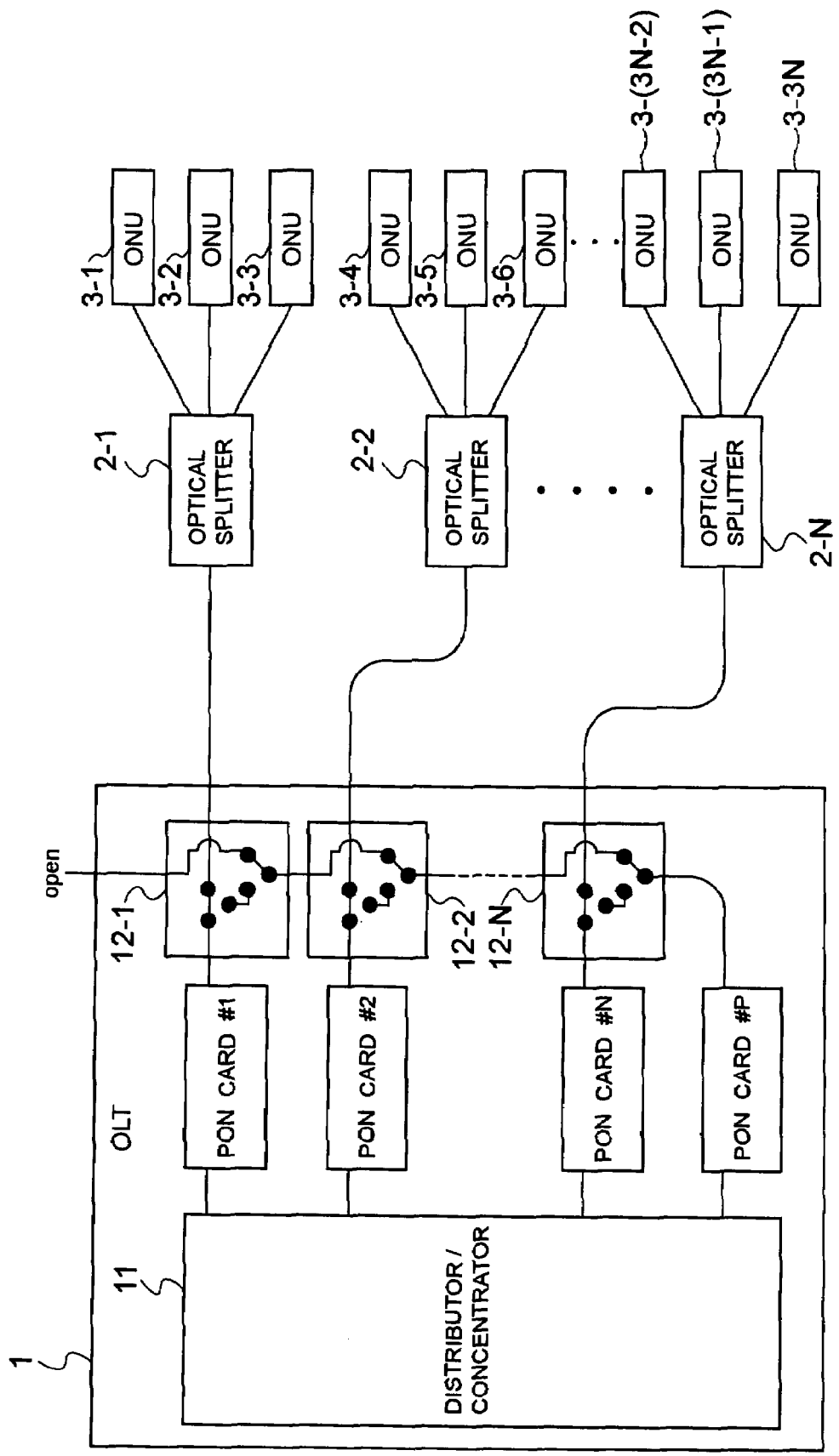
FIG. 2 is a diagram showing an inner configuration of the OLT 1 according to the first exemplary embodiment of the present invention.

FIG. 2 is a diagram showing an inner configuration of the OLT 1 according to the first exemplary embodiment of the present invention. In FIG. 2, the OLT 1 is configured to connect any one of N PON networks to a standby PON card #P by cascading N optical switch modules 12-1 to 12-N including two optical switches and switching the connection of the two optical switches.

N PON cards #1 to #N for current use are usually connected to each of the PON networks and disconnected from the network by optical switch modules 12-1 to 12-N in response to a failure or a command from an operating system (hereinafter referred to as OS) as a trigger.

Figure 3:
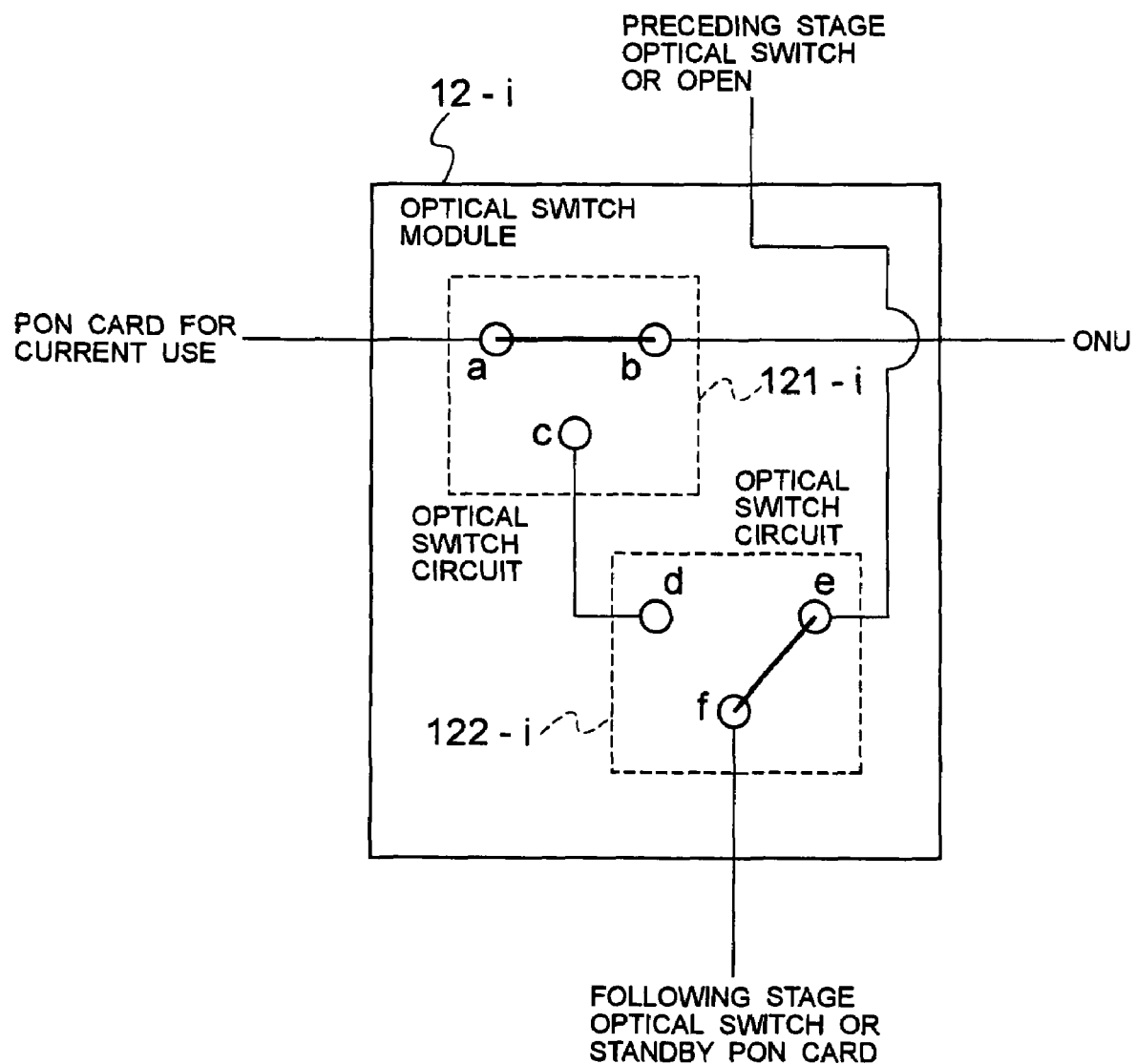
FIG. 3 is a diagram showing an inner configuration of the optical switch module in FIG. 2.
Figure 4:
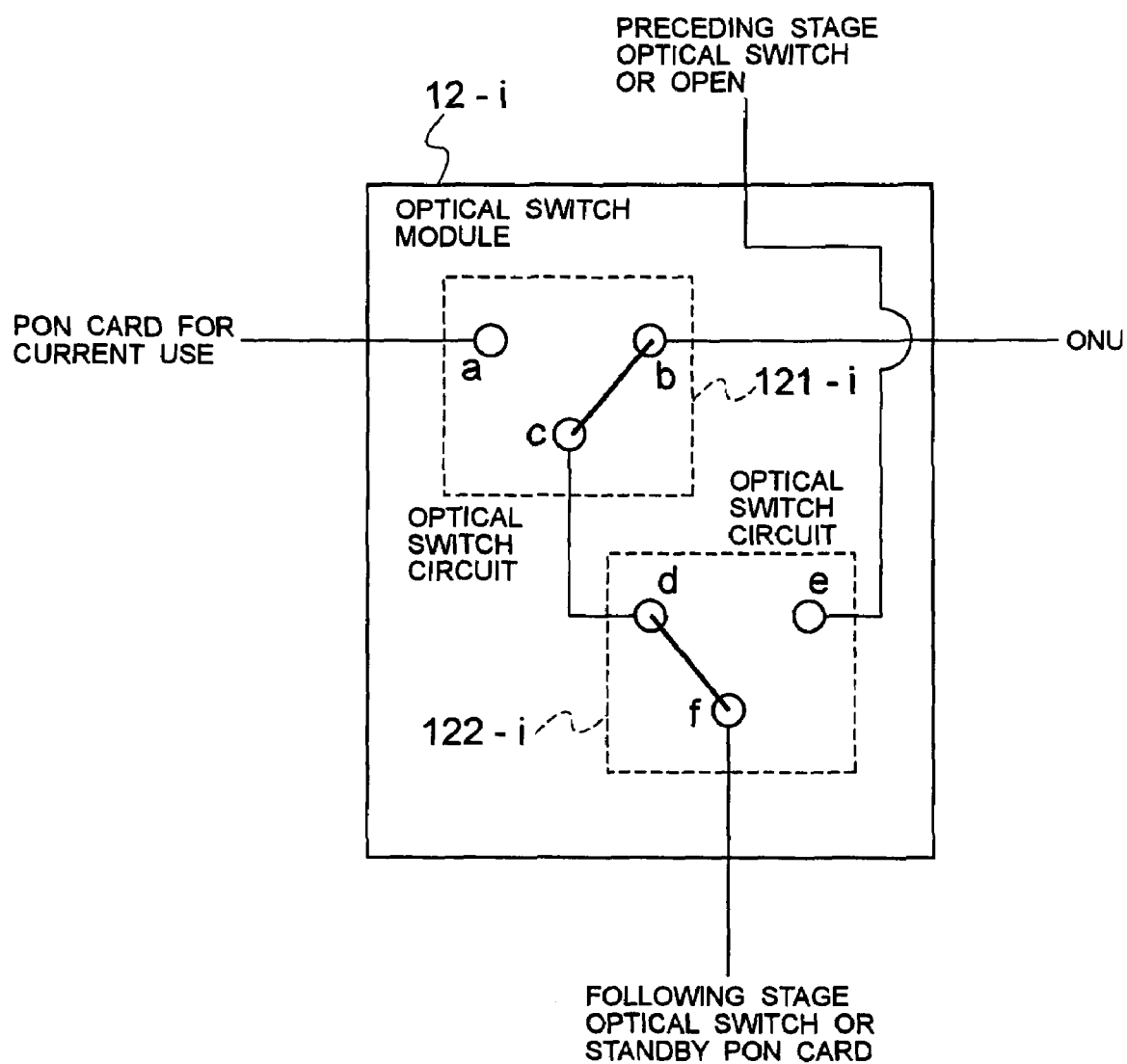
FIG. 4 is a diagram showing an inner configuration of the optical switch module in FIG. 2.

Each of FIG. 3 and FIG. 4 is a diagram showing an inner configuration of the optical switch modules 12-1 to 12-N in FIG. 2. In FIG. 3 and FIG. 4, an optical switch circuit 121-*i* of an optical switch module 12-*i* (i=1, . . . , N) is a switch for connecting "b" to "a" or "c", and an optical switch circuit 122-*i* is a switch for connecting "f" to "d" or "e".

FIG. 3 is a diagram showing a case where a signal outside the OLT 1 (an optical signal of the PON network) is connected to each of the PON cards #1 to #N for current use. Here, the preceding stage optical switch module and the following stage optical switch module (or the standby PON card #P) are connected with each other via the optical switch circuit 122-*i*. FIG. 4 is a diagram showing a case where an optical signal outside the OLT 1 is connected to a standby PON card #P.

Figure 5:
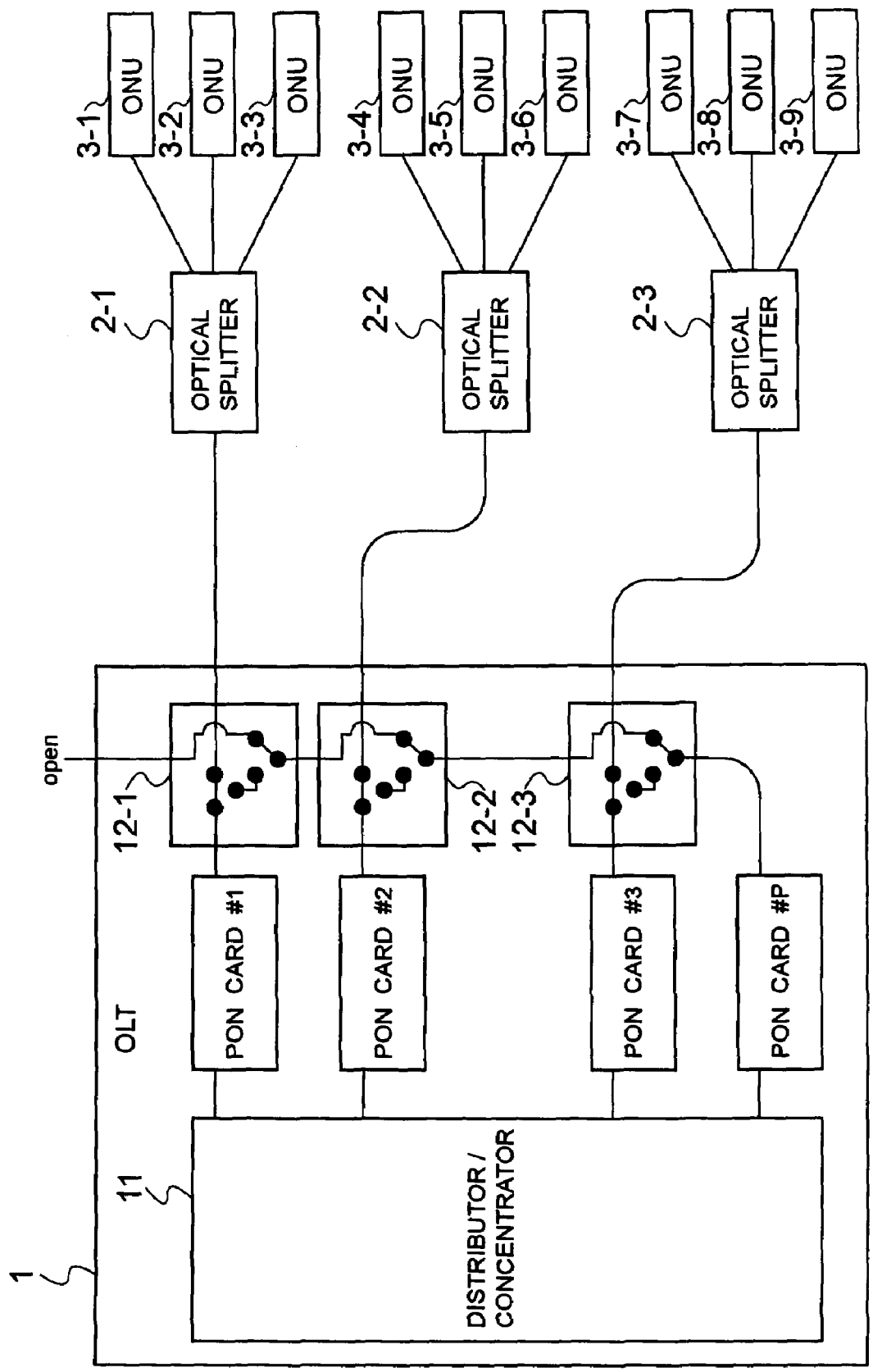
FIG. 5 is a diagram showing connection of the optical switch module when N=3 in the first exemplary embodiment of the present invention.
Figure 6:
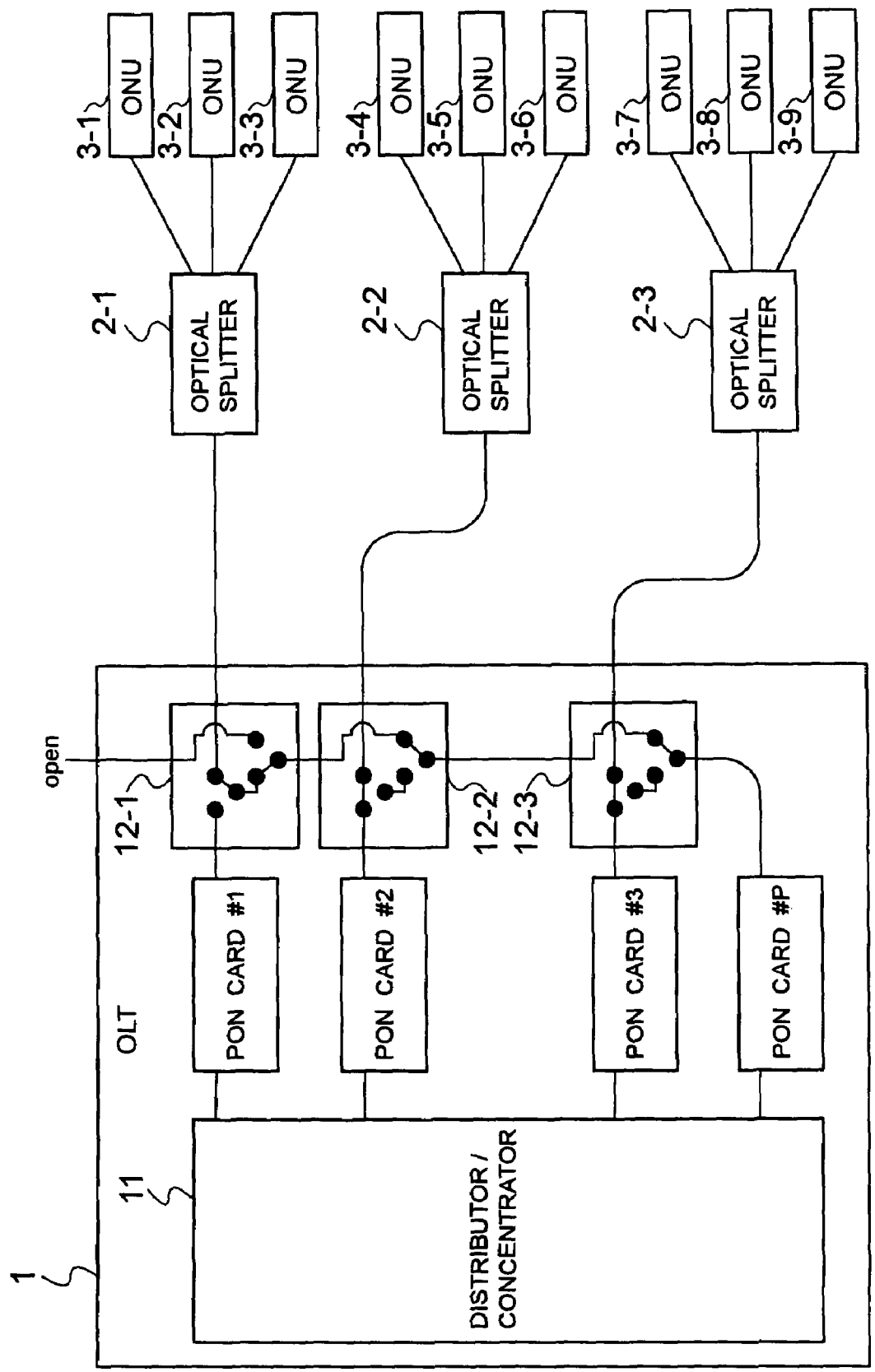
FIG. 6 is a diagram showing connection of the optical switch module when N=3 in the first exemplary embodiment of the present invention.
Figure 7:
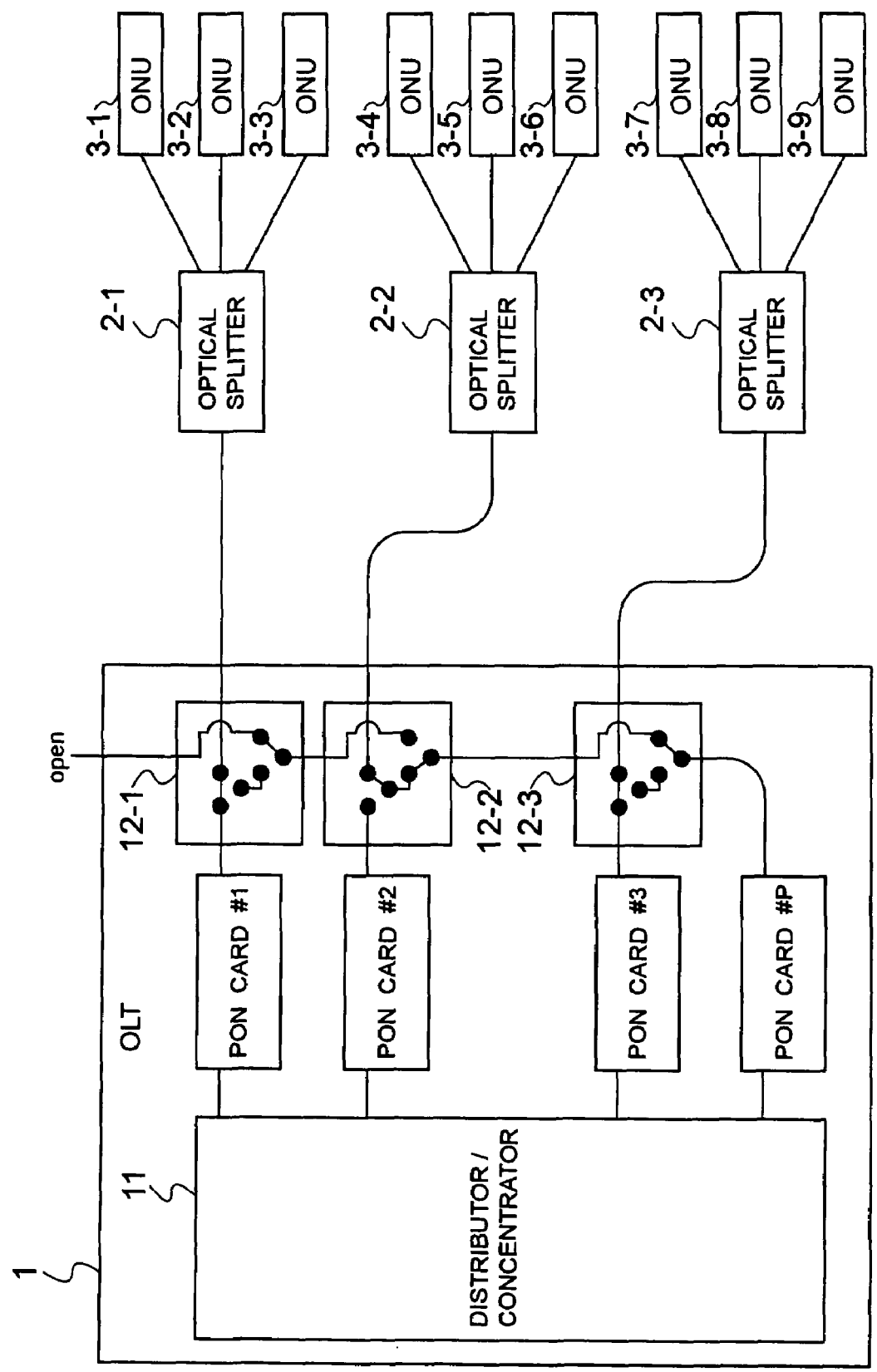
FIG. 7 is a diagram showing connection of the optical switch module when N=3 in the first exemplary embodiment of the present invention.
Figure 8:
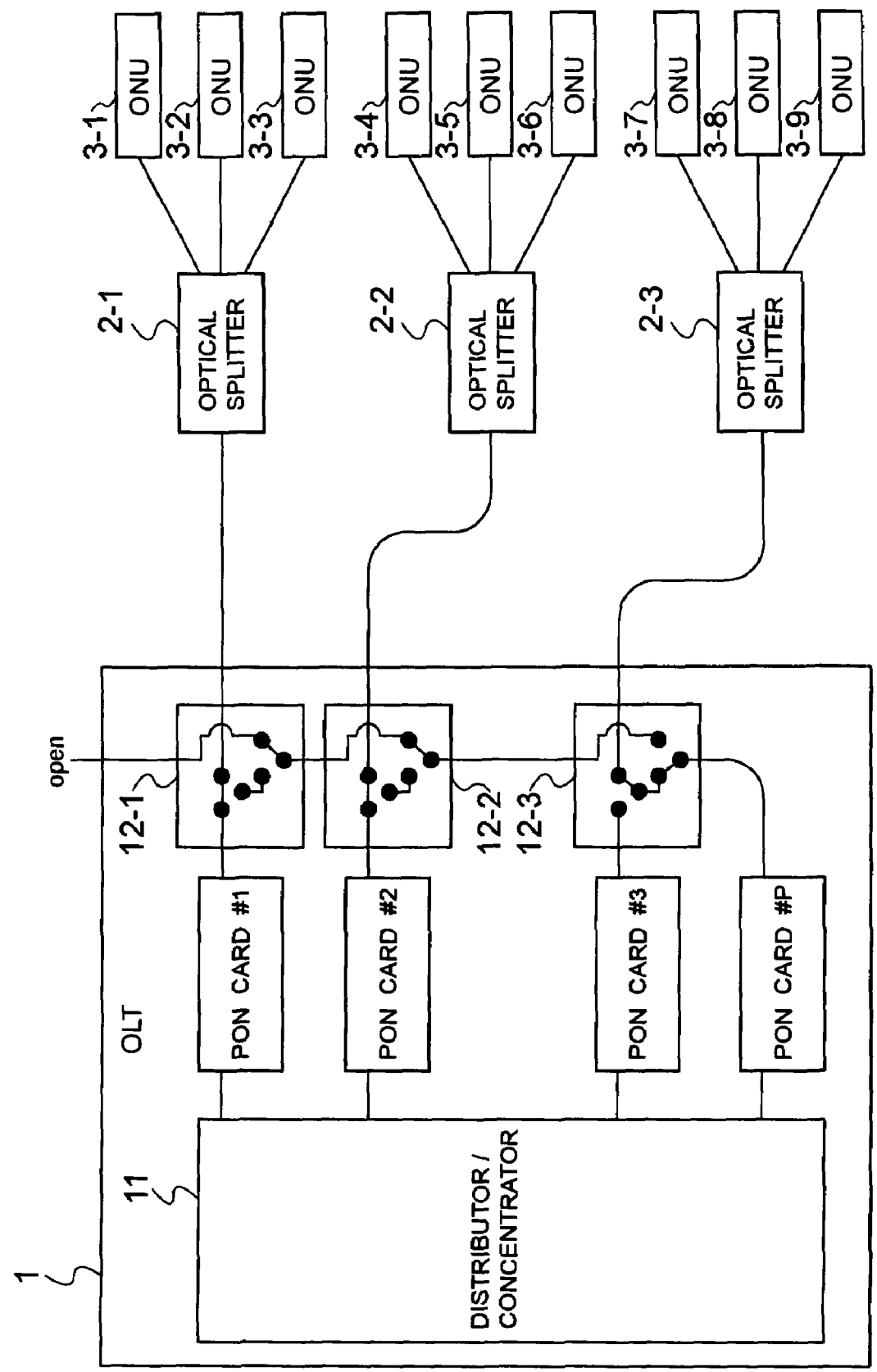
FIG. 8 is a diagram showing connection of the optical switch module when N=3 in the first exemplary embodiment of the present invention.

Each of FIG. 5 to FIG. 8 is a diagram showing a connection of optical switch modules 12-1 to 12-3 where N=3 in the first exemplary embodiment of the present invention. FIG. 5 shows a case where a PON network is connected to each of the PON cards #1 to #3 fur current use without switching. Each of FIG. 6 to FIG. 8 shows a case where three PON networks are connected to the standby PON card #P.

Figure 9:
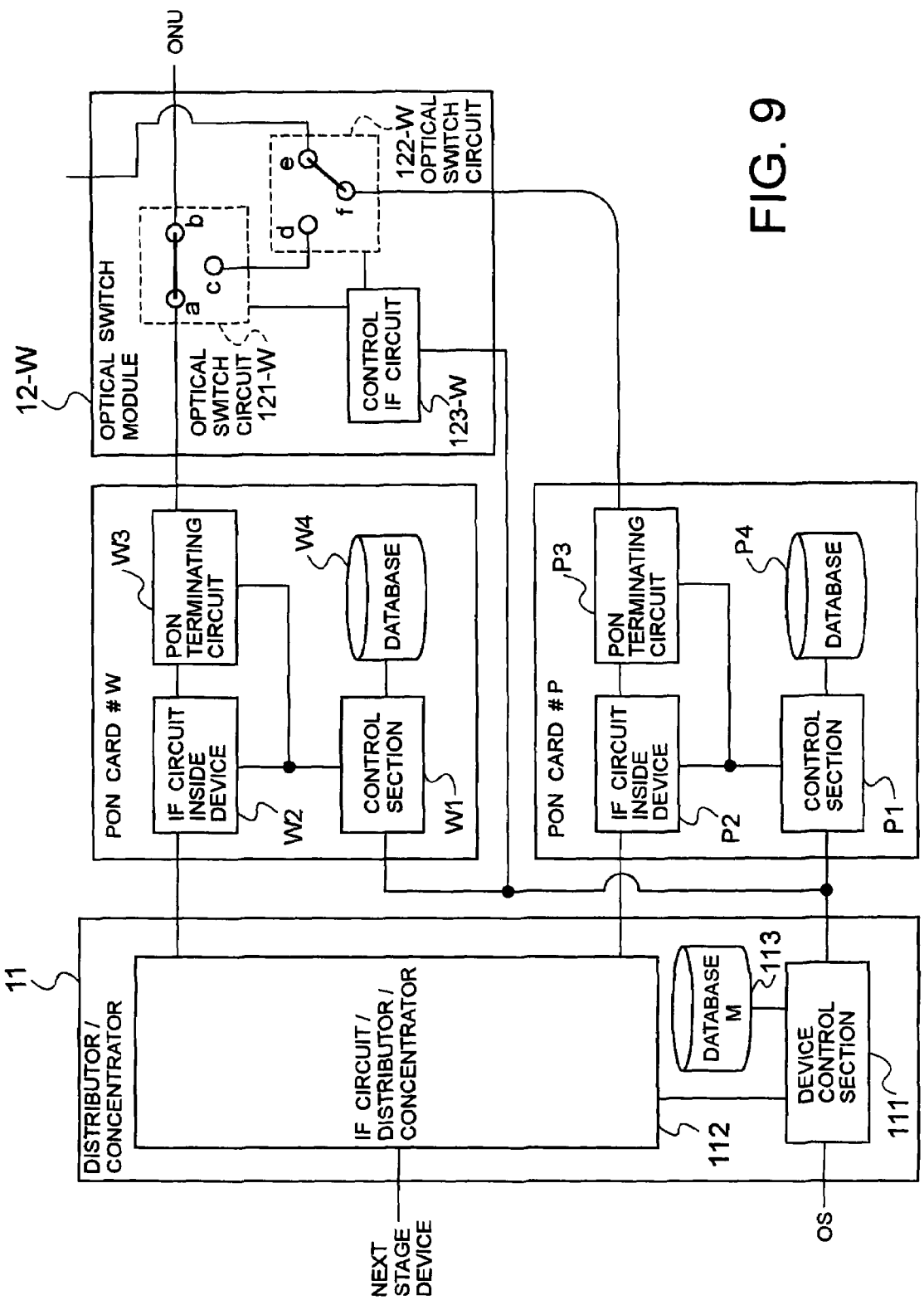
FIG. 9 is a diagram showing each function block inside the OLT shown in FIG. 1 and FIG. 2.
Figure 10:
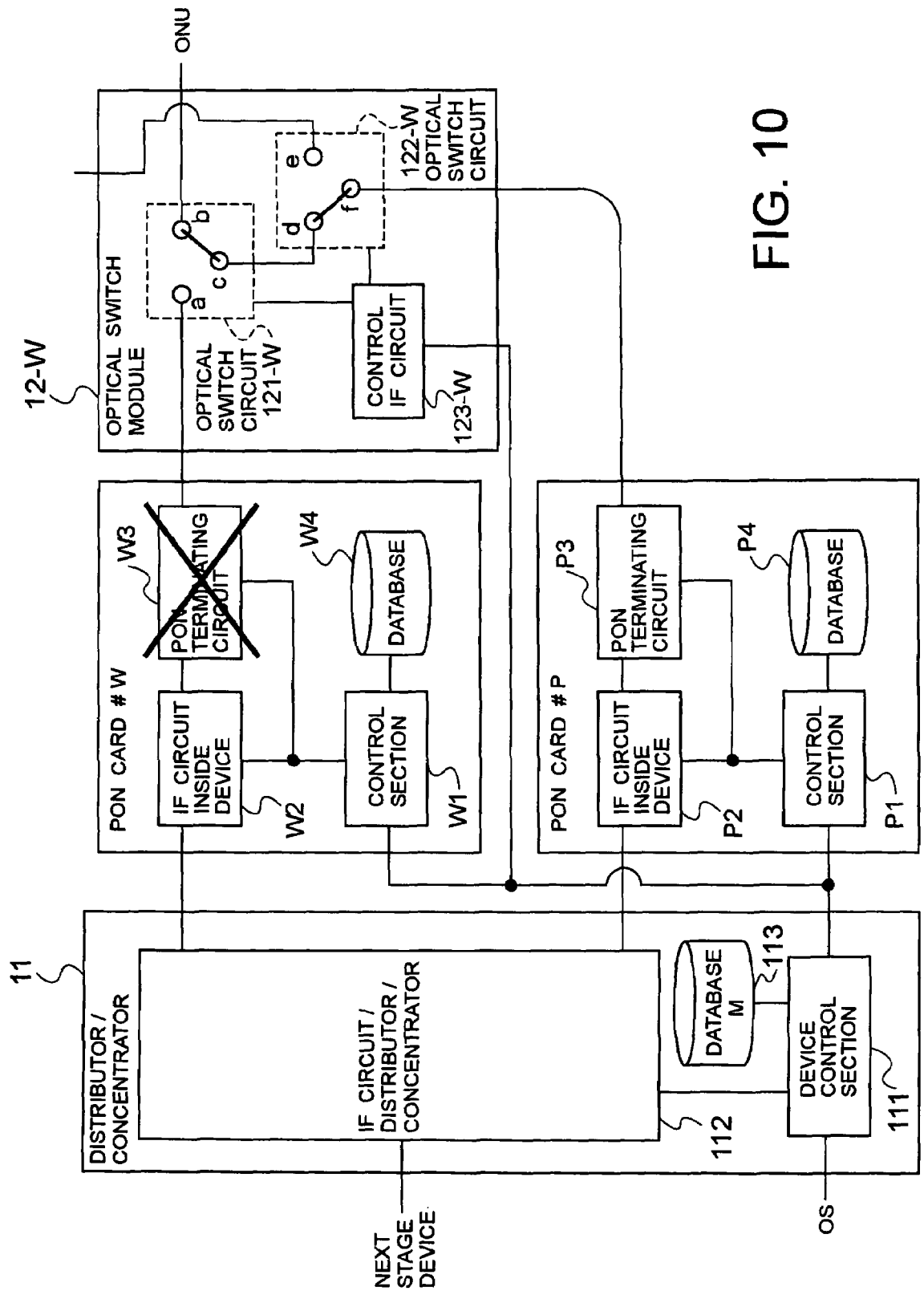
FIG. 10 is a diagram showing each function block inside the OLT shown in FIG. 1 and FIG. 2.

FIG. 9 and FIG. 10 are diagrams showing function blocks inside the OLT 1 shown in FIG. 1 and FIG. 2, respectively. For simplicity of the description, only one PON card for current use (PON card #1) is shown. FIG. 9 shows a case where a PON card for current use #W is connected, and FIG. 10 shows a case where a standby PON card #P is connected.

To a distributor/concentrator 11, a main signal interface (IF) circuit/concentrating/distributing circuit with outside 112, a device control section 111 and a device database (memory) 113 are mounted. To the PON cards #W and #P, PON terminating circuits W3 and P3, interface (IF) circuits inside device W2 and P2, control sections W1 and P1 and databases (memory) W4 and P4 are mounted. To the optical switch module 12-W, two optical switch circuits 121-W and 122-W and a control interface (IF) circuit 123-W are mounted.

The device control section 111 of the distributor/concentrator 11 is connected to controlling sections W1 and P1 and a control interface circuit 121-W of each section through control signal lines. The device control section 111 and the control sections W1 and P1 are connected with the device database 113, the databases W4 and P4. The device database 113 of the distributor/concentrator 11 stores setting information of the entire device, setting information of each section and control information of the PON. The databases W4 and P4 of the PON cards #W and #P only store setting information and control information relating to operations of the PON cards #W and #P.

Figure 11:
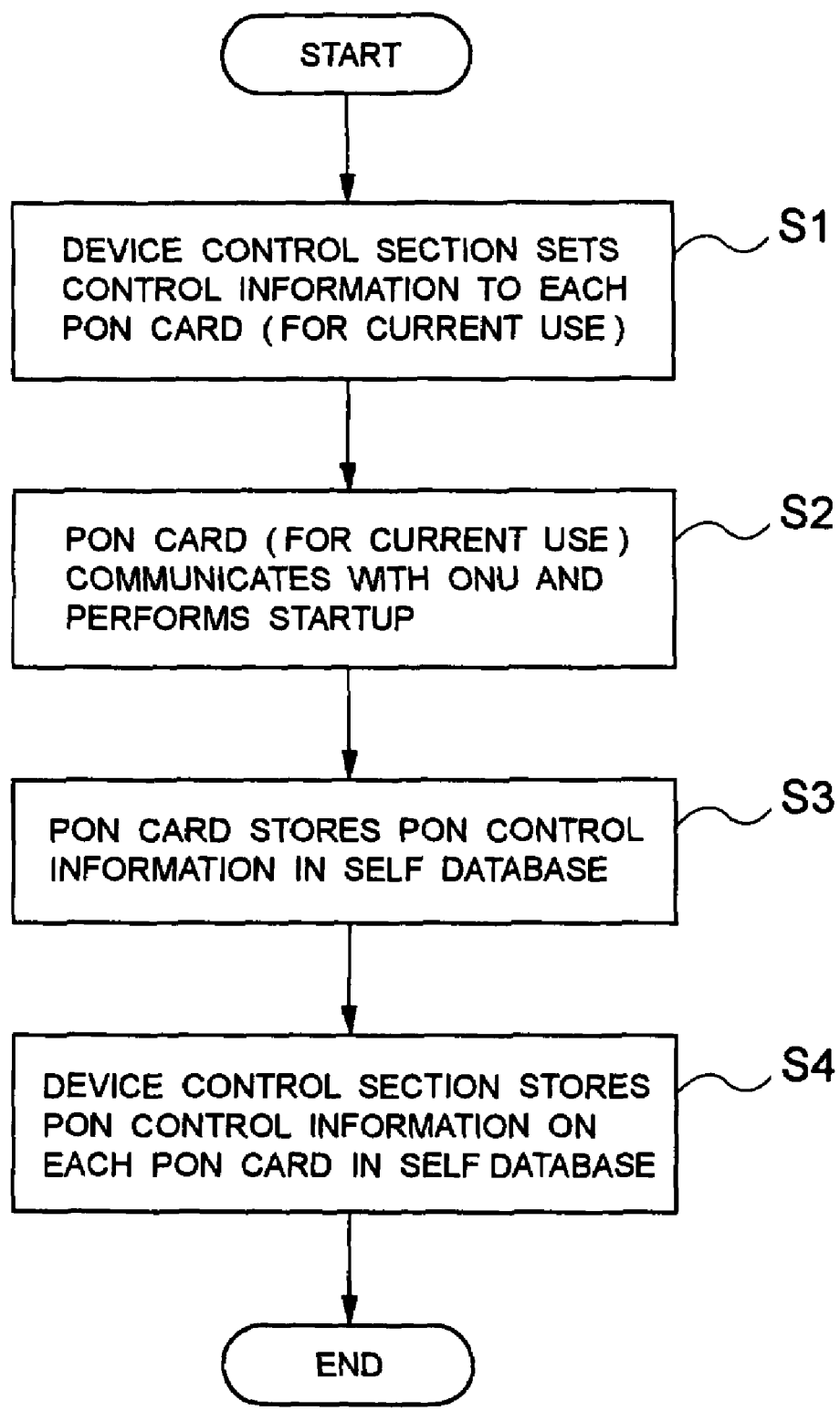
FIG. 11 is a flowchart showing a startup flow according to the first exemplary embodiment of the present invention.
Figure 12:
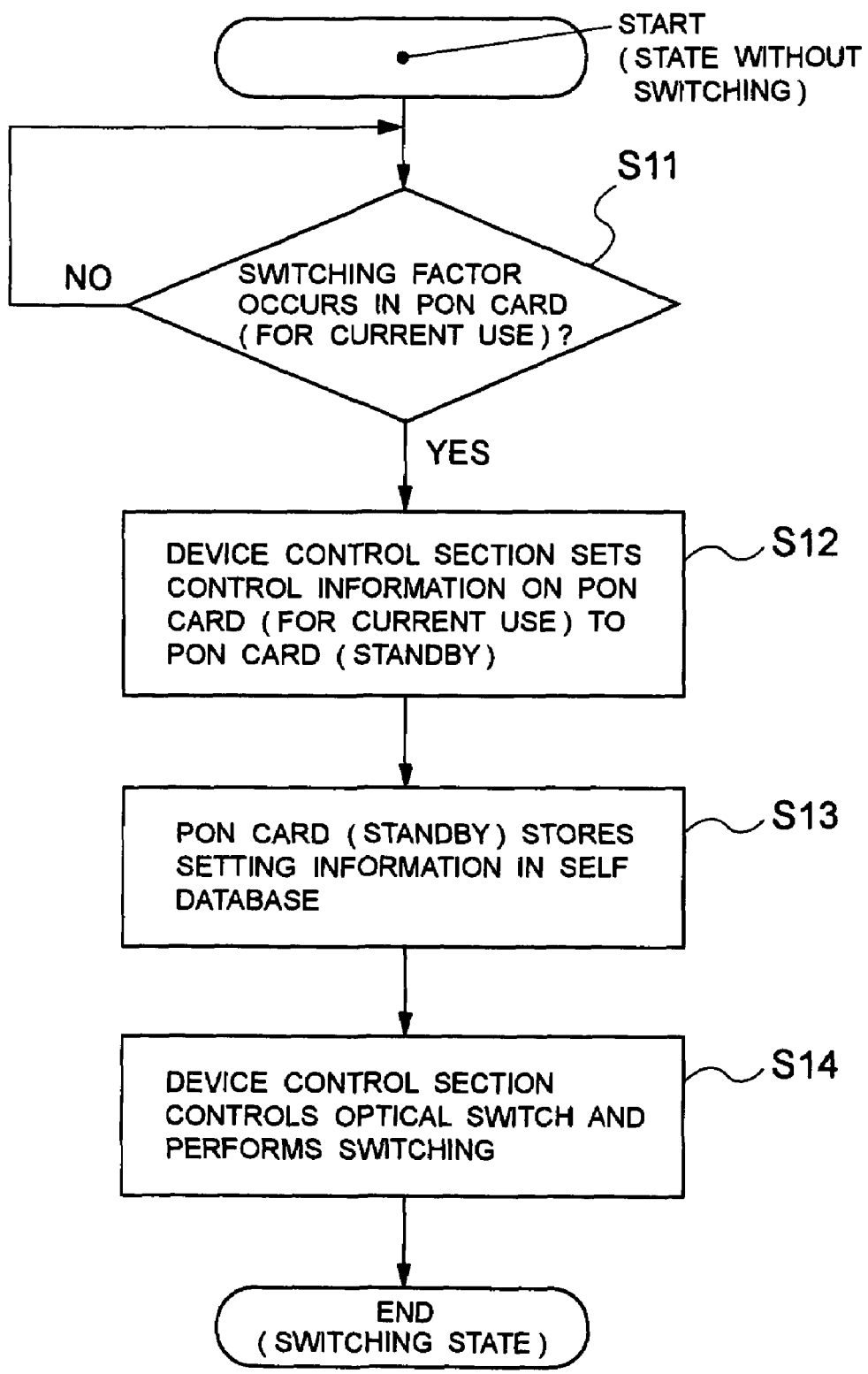
FIG. 12 is a flowchart showing a switching flow according to the first exemplary embodiment of the present invention.
Figure 13:
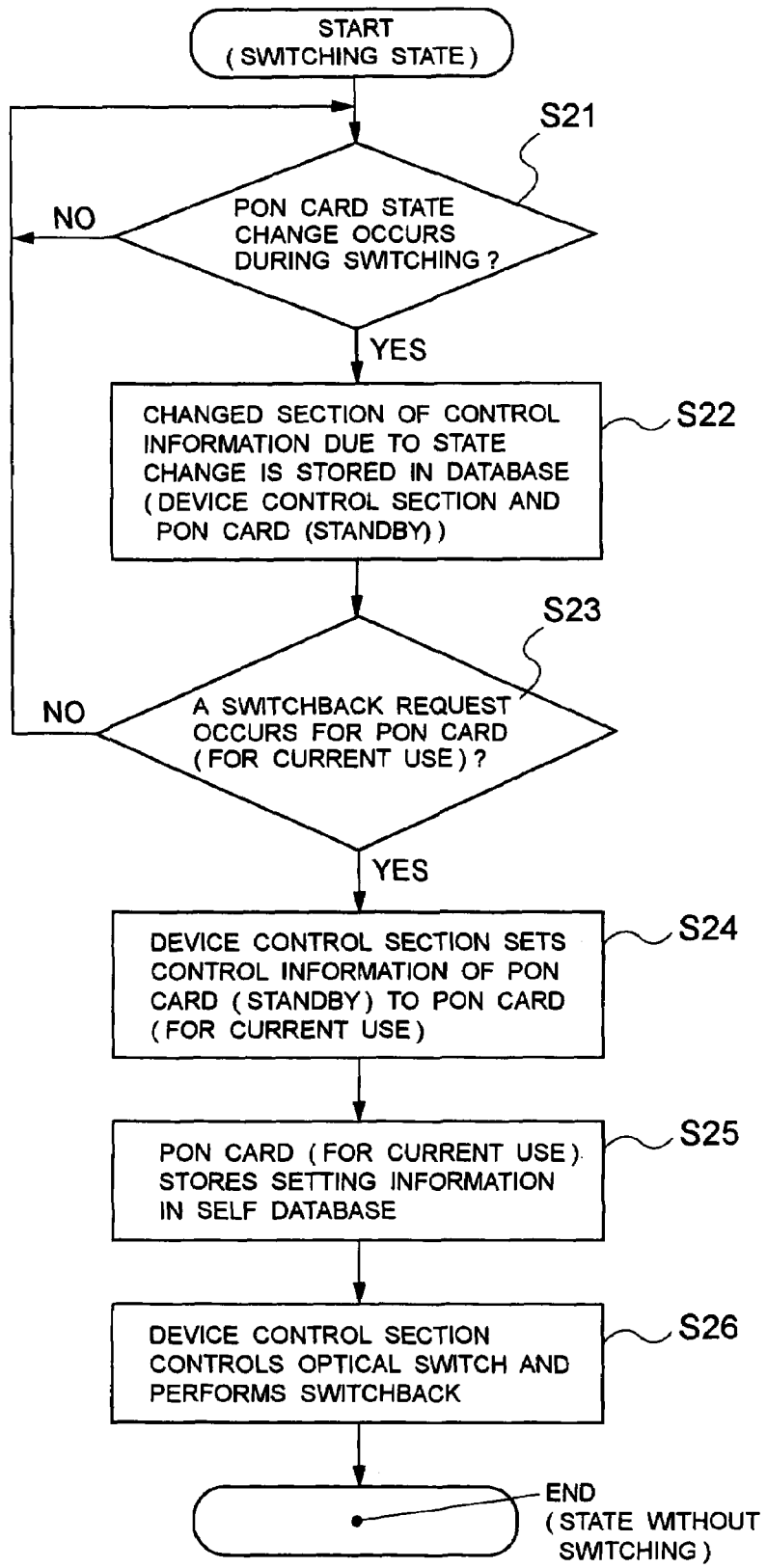
FIG. 13 is a flowchart showing switching and switchback according to the first exemplary embodiment of the present invention.

FIG. 11 is a flowchart showing a startup flow according to the first exemplary embodiment of the present invention. FIG. 12 is a flowchart showing a switching flow according to the first exemplary embodiment of the present invention. FIG. 13 is a flowchart showing switching and switchback according to the first exemplary embodiment of the present invention. Each of FIG. 14 and FIG. 15 is a diagram showing an example of configuration of a table used in prioritization when a request for switching a PON card for current use is generated. A redundant method of the PON system according to the first exemplary embodiment of the present invention will be described with reference to FIG. 1 to FIG. 15.

In FIG. 9, the PON card #W for current use is connected to the PON network (ONU) via the optical switch module 12-W when the system starts up. Here, as the OLT 1 starts up, a delay time between itself and each of the ONUs 3-1 to 3-3N is measured, and the measurement is stored in the database W4 of the PON card #W and the device database 113 of the distributor/concentrator 1 as control information.

Each of the database W4 of the PON card #W and the device database 113 of the distributor/concentrator 11 stores various types of setting information for controlling the PON network. Those types of information include information on priorities of the ONU 3-1 to 3-3N and an allocated band to each flow. Additionally, the device database 113 of the distributor/concentrator 11 also stores priorities of a plurality of PON cards #1 to #N. These setting information can be set and changed via the device control section 111 from an external OS.

A standby PON card #P is not connected to any of the PON network. To the database P4 of the standby PON card #P, information on the first PON card for current use is written as a default. FIG. 9 shows only one PON card for current use to simplify the description, though, there are actually N PON cards for current use (PON cards #1 to #N), being numbered from the first to the N$^{th}$.

Startup performed by the OLT 1 will be described. When the OLT 1 begins to start up, the device control section 111 sets control information (ONU priority, allocated band to each dataflow) to each of the PON cards for current use #1 to #N (step S1 in FIG. 11). Then, the device control section 111 sets the same information as that of the PON card for current use #1 to the standby PON card #P.

Next, in the OLT 1, the PON cards for current use #1 to #N communicate with the ONU 3-1 to 3-3N and performs startup (measuring a delay time to and from and an optical receiving power, adjustment of an optical sending power, taking ONU information and the like) (step S2 in FIG. 11).

The PON cards for current use #1 to #N store the PON control information (the above-mentioned measurements and adjustment result) in the database of itself (step S3 in FIG. 11). The device control section 111 stores the PON control information of each of the PON cards for current use #1 to #N in the device database 113 (step S4 in FIG. 11). The startup in the OLT 1 ends here.

Assuming that a PON card for current use #W happens to have a factor for switching (occurrence of a failure or a request for switching from the OS) in the above-mentioned state as shown in FIG. 10. When the device control section 111 detects the factor to be switched (step S11 in FIG. 12), it is switched in the procedure below.

First, the device control section 111 sets the database information of the failed PON card for current use #W (ONU priority, an allocated band to each of the dataflow, a delay time to and from each ONU, an optical receiving power, an optical sending power, ONU information and the like) to the standby PON card #P (the delay time to and from is set in consideration of the delay time inside device of the OLT 1) (step S12 in FIG. 12).

As the device database 113 includes the above-mentioned information, the device control section 111 reads the information and writes it in the database P4 of the standby PON card #P (step S13 in FIG. 12). Here, it is assumed that a value of an adjusted optical channel length inside the device of the OLT 1 (a value with a delay due to the channel length inside the device added) is set and written for the delay time to and from information of the PON.

This is because a delay due to an optical channel length inside the device cannot be ignored in an ultra-high speed PON. If the uplink rate is 1 giga-bit/sec, for example, 1 bit corresponds to 1 nano-sec, which corresponds to about 20 cm of an optical fiber. As the optical switch modules 12-1 to 12-N are cascaded in the exemplary embodiment, optical channel lengths between respective PON cards for current use #1 to #N and a standby PON card #P differ. Therefore, the device control section 111 adjusts a delay due to an optical channel length for each of the PON cards for current use #1 to #N.

After the PON cards #1 to #N and the databases are set, the device control section 111 switches the optical switch circuits 121-W and 122-W via the control interface circuit 123-W (step S14 in FIG. 12). FIG. 10 shows the state of the optical switch circuits 121-W and 122-W after the above-mentioned switching.

The above-mentioned procedure enables the standby PON card #P to immediately start communication with the ONUs 3-1 to 3-3N, omitting the initial startup of measuring a delay time to and from for the connected PON network.

If an OS changes setting information or control information of the PON changes according to a change in the state of the PON network while the circuits are switched, the new information is stored in both of the database P4 and the device database 113.

Now, a switchback procedure in the case where the failed PON card for current use #W is changed and the operation recovered will be described. To the newly exchanged PON card for current use #W, information based on the device database 113 is set from the device control section 111, while the same information is set to the database W4 (steps S21 to S25 in FIG. 13).

That is, the device control section 111 checks whether the state of the PON card changes or not during the switching of the circuits (step S21 in FIG. 13). If the state of the PON card changes, the device control section 111 stores the changed section of the control information due to the state change in the database M 113, while the control section P1 stores the same information in the database P4 (step S22 in FIG. 13).

Next, the device control section 111 checks whether a request for switchback the PON card (for current use) is generated or not (step S23 in FIG. 13). If a request for switchback the PON card (for current use) is generated, control information of the PON card (standby) is set to the PON card (for current use) (step S24 in FIG. 13).

Then, the control section W1 of the PON card (for current use) stores the control information in the database W4 of itself (step S25 in FIG. 13).

Thereafter, the device control section 111 connects an external network to the PON card for current use #W by switching the optical switch circuits 121-W and 122-W via the control interface circuit 123-W (step S26 in FIG. 13). Then, the device control section 111 sets default information (the same information as that on the PON card for current use #1) to the standby PON card #P and also writes the information in the database P4.

If switching is performed in response to a switching command from an OS, the same procedure as that mentioned above follows except that a failure detecting process is omitted from the above-mentioned procedure. The switchback procedure is the same as that mentioned above.

FIG. 5 to FIG. 8 show cases where no switching is done and the case of switching the respective PON cards for current use #1 to #3 where N=3. Each of the PON networks can be prioritized. If a plurality of PON cards for current use #1 to #W have failures at the same time, the device control section 111 controls to switch the PON network with the higher priority to the standby PON card #P.

In the exemplary embodiment, the table shown in FIG. 14 is used where switching requests are sequentially generated and the table shown in FIG. 15 is used where switching requests are generated at the same time in the above-mentioned switching so that control can be performed to switch the PON network with the higher priority to the standby PON card #P.

Unlike the conventional 1+1 redundant method, redundant can be realized, without significantly increasing volume of the OLT 1 and significantly decreasing the number of accommodating lines in the exemplary embodiment. Therefore, an economical and highly reliable PON system can be built.

In the exemplary embodiment, the standby PON card #P takes over setting/controlling information on the PON cards for current use #1 to #N with a delay due to an optical channel length inside the device when the cards are switched. That enables the initial startup of the PON to be eliminated, a time for switching to be shortened and signal conduction to be rapidly realized.

Also in the exemplary embodiment, with a configuration using an optical switch 12, an advantage of reducing optical power loss more than by a conventional configuration with an optical branch and decreasing the restriction on a distance is achieved.

Exemplary Embodiment 2

FIG. 16 is a block diagram showing an example of a configuration of a PON system according to the second exemplary embodiment of the present invention. In contrast to the first exemplary embodiment of the present invention, which has a redundant configuration for cascading 2:1 optical switch circuits, the PON system according to the second exemplary embodiment of the present invention has a redundant configuration using N 2:1 optical switches 12a-1 to 12a-N and an N:1 optical switch 12-P as shown in FIG. 16. In the second exemplary embodiment, the optical channel lengths inside the device for the PON cards for current use #1 to #N and the standby PON card #P can be the same so that an adjusted value of the delay time to and from the PON in switching is kept consistent whatever the PON cards for the current use are.

Exemplary Embodiment 3

Figure 17:
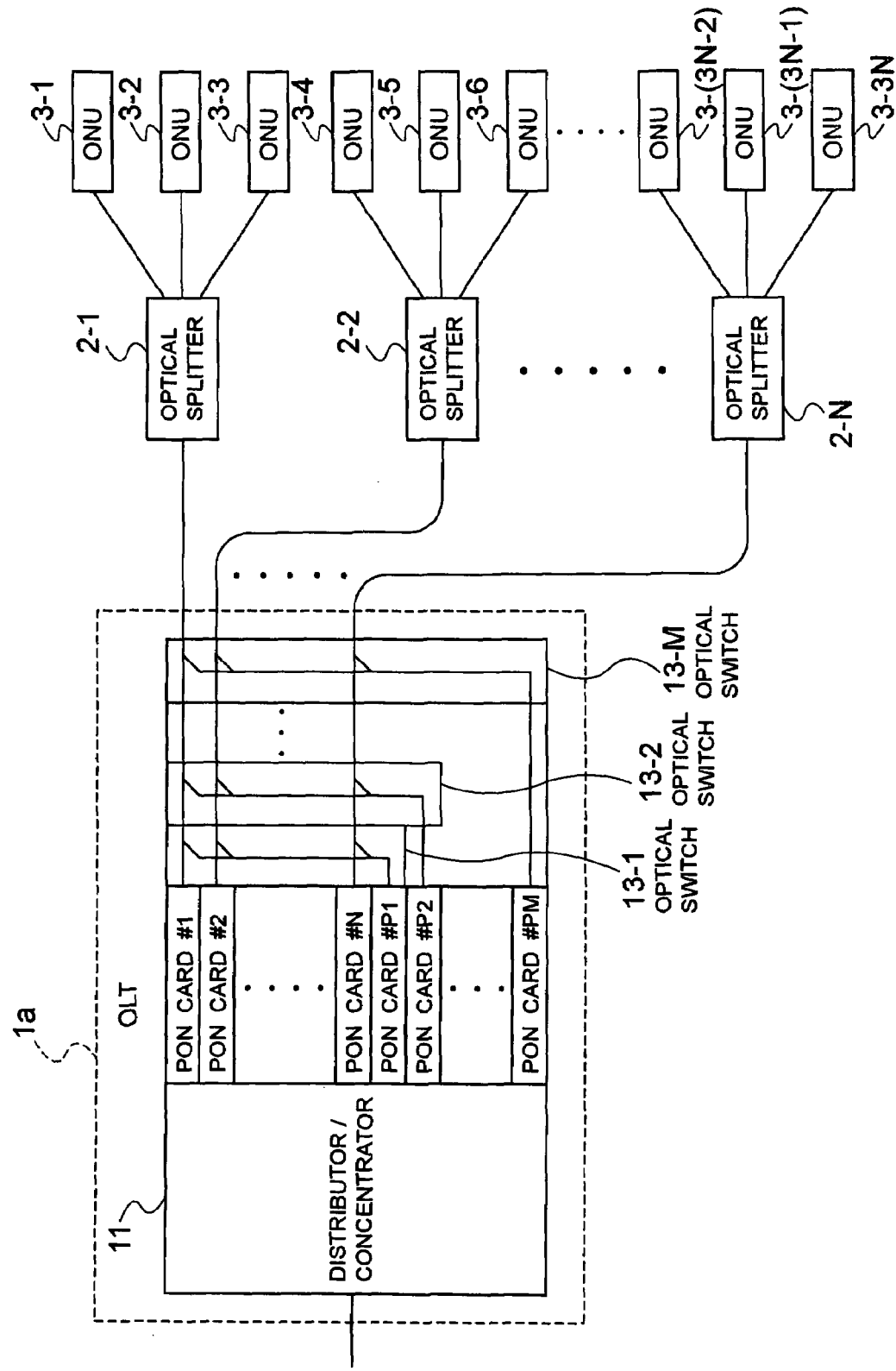
FIG. 17 is a block diagram showing a configuration of the PON system according to the third exemplary embodiment of the present invention.

FIG. 17 is a block diagram showing a configuration of the PON system according to the third exemplary embodiment of the present invention. In FIG. 17, the PON system according to the third exemplary embodiment of the present invention realizes M:N redundant configuration of the station side device (OLT) 1a by allocating M (M is a positive integer) PON cards (PON interface section) #P1 to #PM to standby and connecting each of the M PON cards with any one of N PON networks via the optical switches 13-1 to 13-M.

Figure 18:
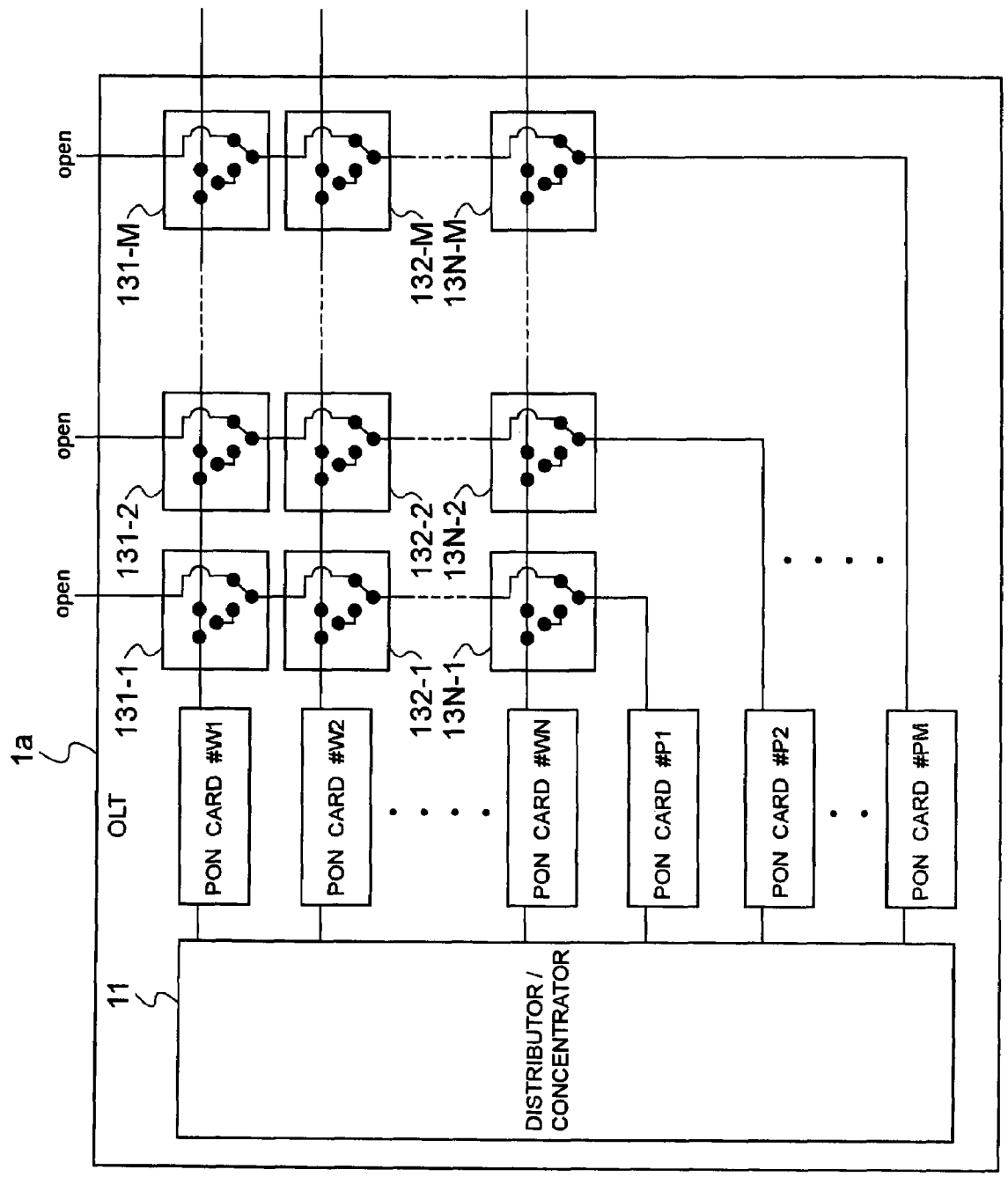
FIG. 18 is a diagram showing an inner configuration of the OLT according to the third exemplary embodiment of the present invention.

FIG. 18 is a diagram showing an inner configuration of the OLT 1a according to the third exemplary embodiment of the present invention. FIG. 18 shows an example of a configuration in which the OLT 1a connects M PON networks among the N PON networks with M standby PON interface sections #P1 to #PM by connecting N×M optical switch modules 131-1 to 13N-1, ..., 131-M to 131N-M including two optical switches in matrices and switching the connection of the optical switches.

N PON cards for current use #W1 to #WN are generally connected with respective PON networks, but disconnected from the networks by the optical switch 131-1 to 13N-1, ..., 131-M to 13N-M in response to a failure or a command from an OS as a trigger.

Figure 19:
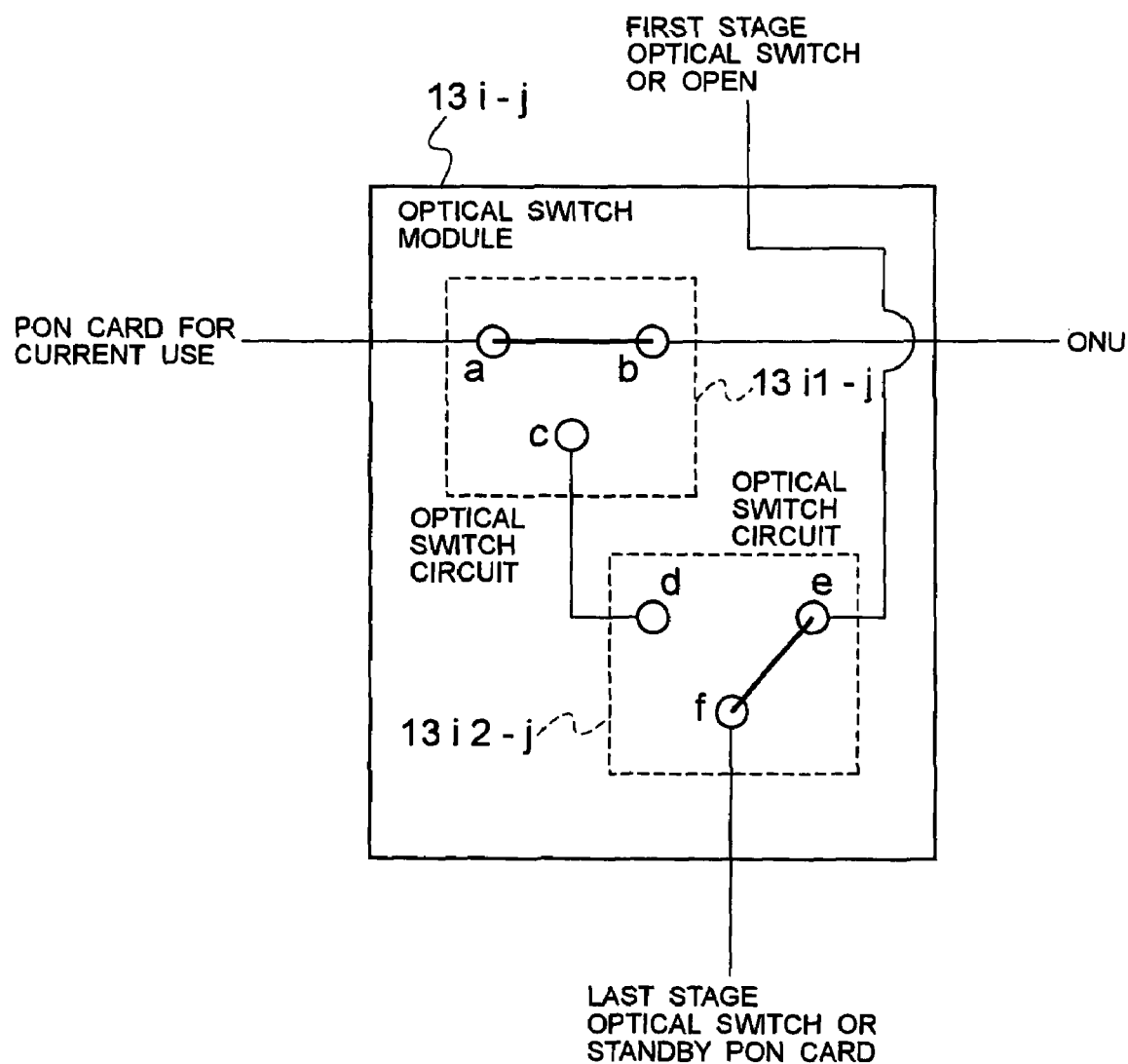
FIG. 19 is a diagram showing an inner configuration of the optical switch module in FIG. 18.
Figure 20:
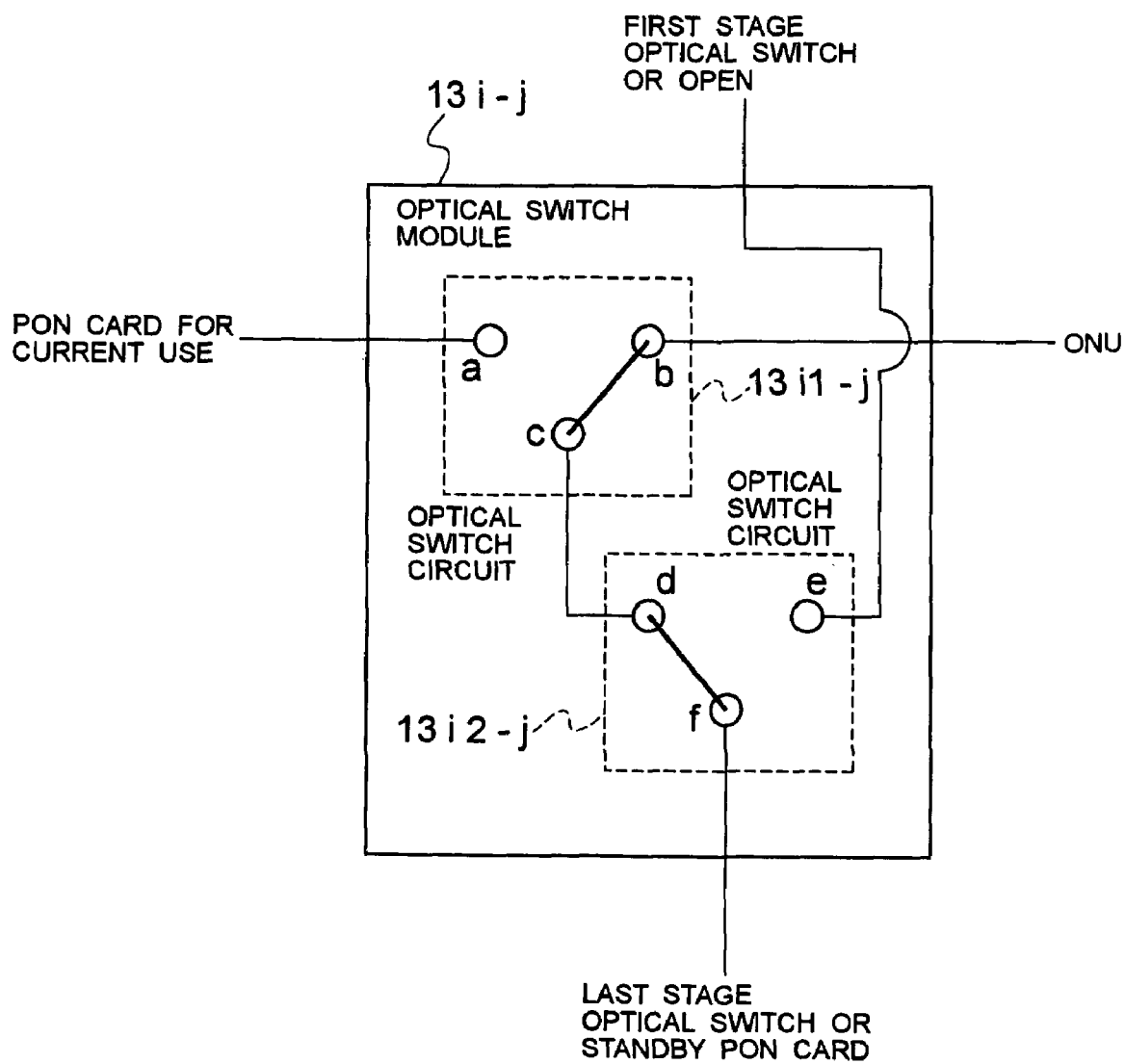
FIG. 20 is a diagram showing an inner configuration of the optical switch module in FIG. 18.

Each of FIG. 19 and FIG. 20 is a diagram showing an inner configuration of the optical switch modules 131-1 to 13N-1, ..., 131-M to 13N-M in FIG. 18. In FIG. 19 and FIG. 20, the optical switch circuits 13i1-j of the optical switch module 131-j (i=1, ..., N, j=1, ..., M) are switches for connecting "b" with "a" or "c", and the optical switch circuits 13i2-j are switches for connecting "f" with "d" or "e".

FIG. 19 shows a case where a signal outside the OLT 1a (optical signal of PON network) is connected with the respective PON cards for current use #W1 to #WN. Here, the optical switch module in the first stage in the horizontal direction and the optical switch module (or a standby PON card) in the last stage in the horizontal direction are connected via the optical switch circuits 13i1 to j. The optical switch modules in the first stage in the vertical direction and the optical switch modules in the last stage in the vertical direction (or a standby PON card) are connected via the optical switch circuits 1312 to j. FIG. 20 shows a case where the optical signal outside the OLT1a is connected with a standby optical interface section.

Figure 21:
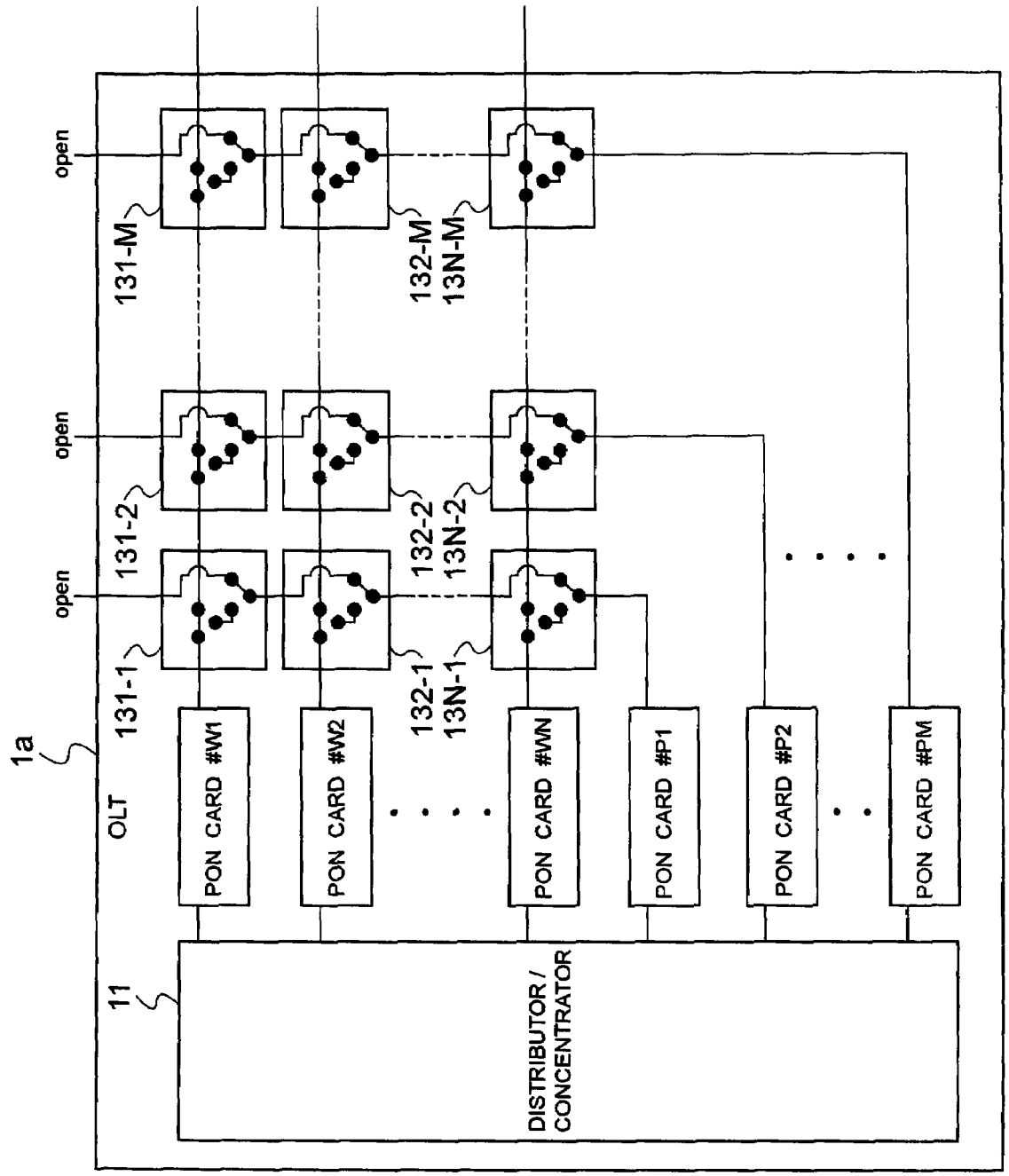
FIG. 21 is a diagram showing a connecting state of the optical switch module according to the third exemplary embodiment of the present invention.
Figure 22:
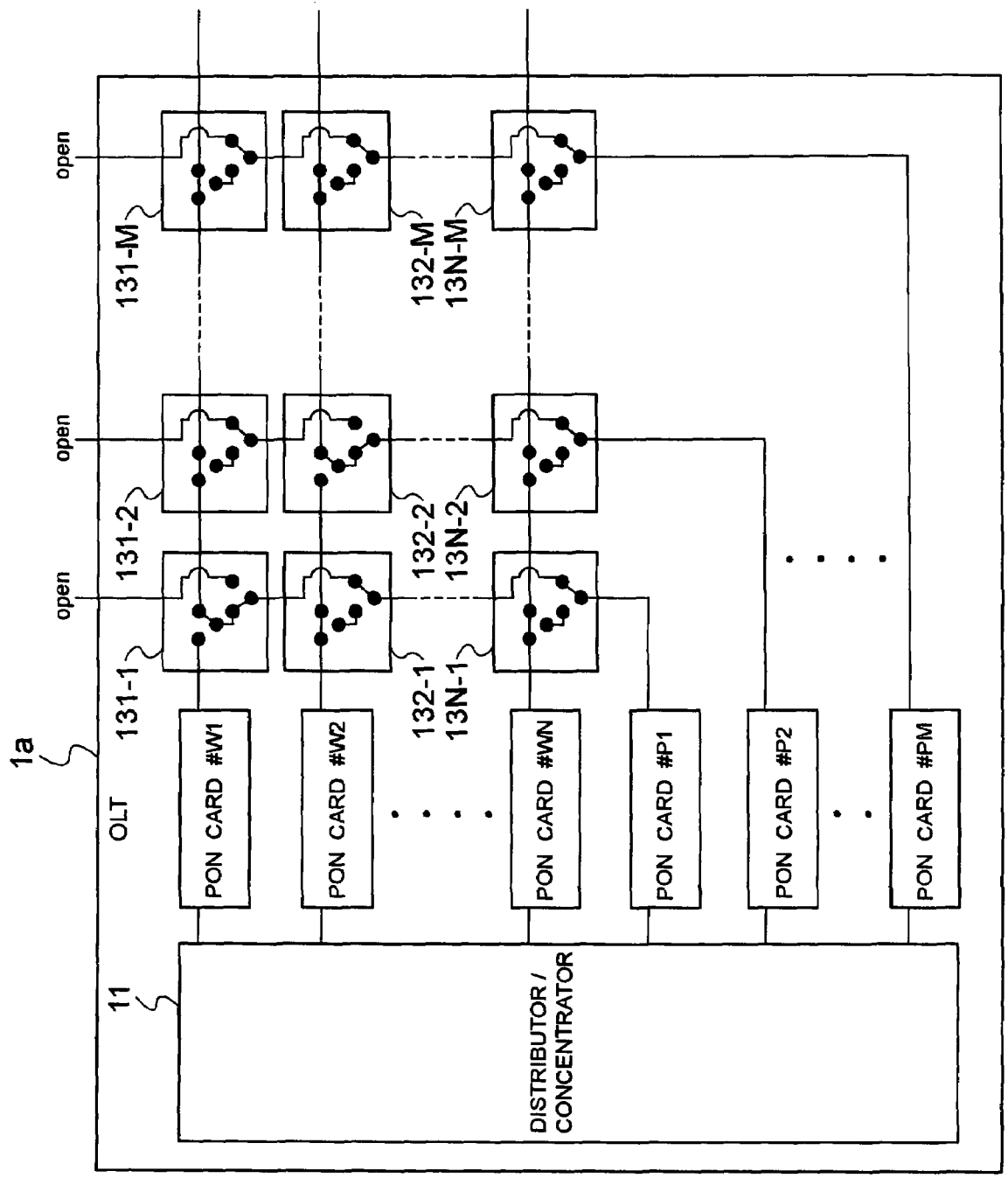
FIG. 22 is a diagram showing a connecting state of the optical switch module according to the third exemplary embodiment of the present invention.
Figure 23:
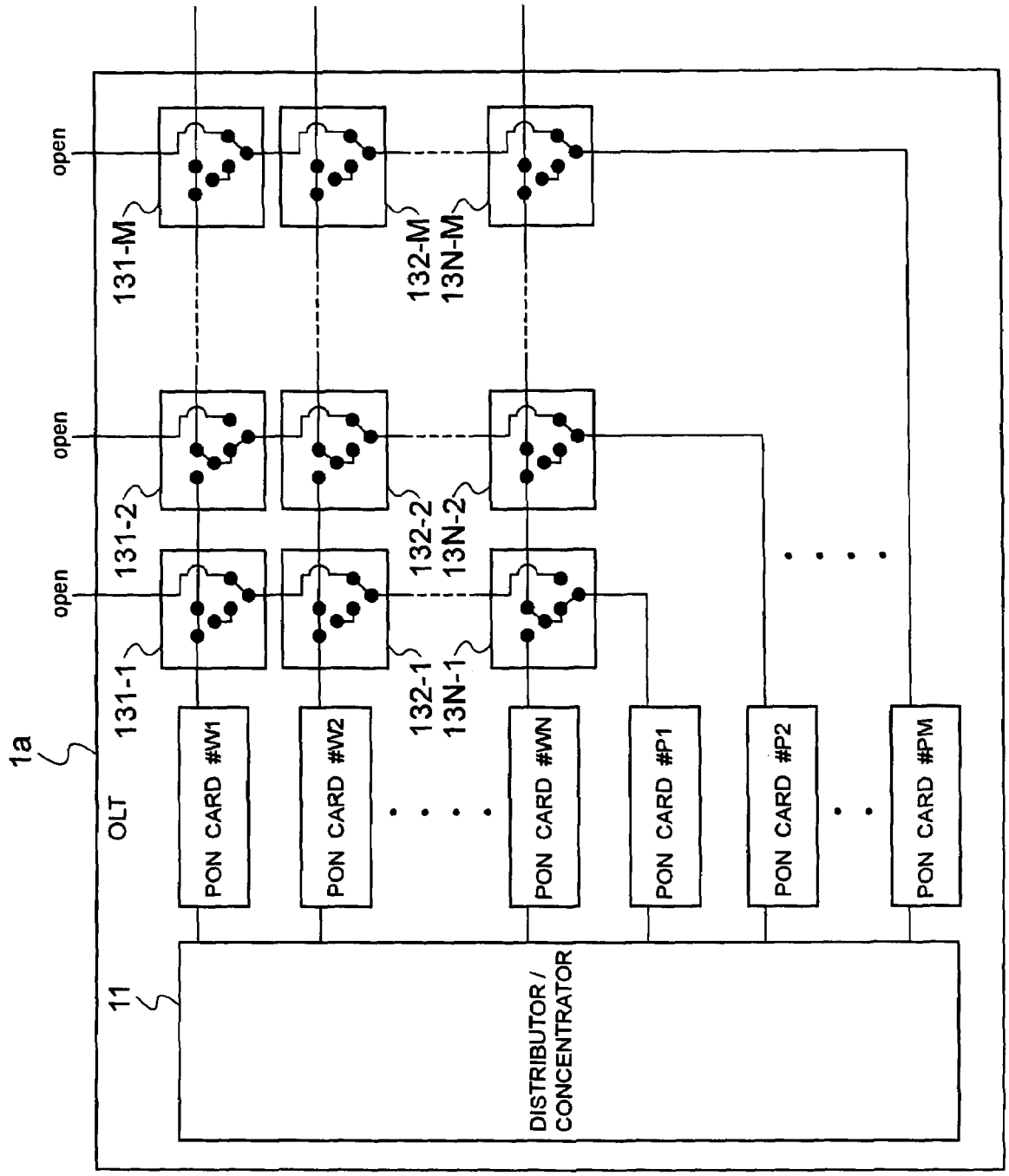
FIG. 23 is a diagram showing a connecting state of the optical switch module according to the third exemplary embodiment of the present invention.

Each of FIG. 21 to FIG. 23 shows a connecting state of the optical switch modules according to the third exemplary embodiment. FIG. 21 shows a case where N PON networks are connected to the respective PON cards #1 to #N without any switching. FIG. 22 shows a case where the first PON network for current use (PON card #W1) is connected with the first standby PON card #P1 and the second PON network for current use (PON card #W2) is connected with the second standby PON card #P2.

FIG. 23 shows a case where the first PON network for current use (PON card #W1) is connected with the second standby PON card #P2 and the N$^{th}$ PON network for current use (PON card #WN) is connected with the first standby PON card #P1. As such, any M PON networks for current use among the N PON networks for current use (PON cards #W1 to #WN) can be connected with any M standby PON cards #P1 to #PM via the optical switch modules 131-1 to 13N-1, 131-M to 13N to M.

Figure 24:
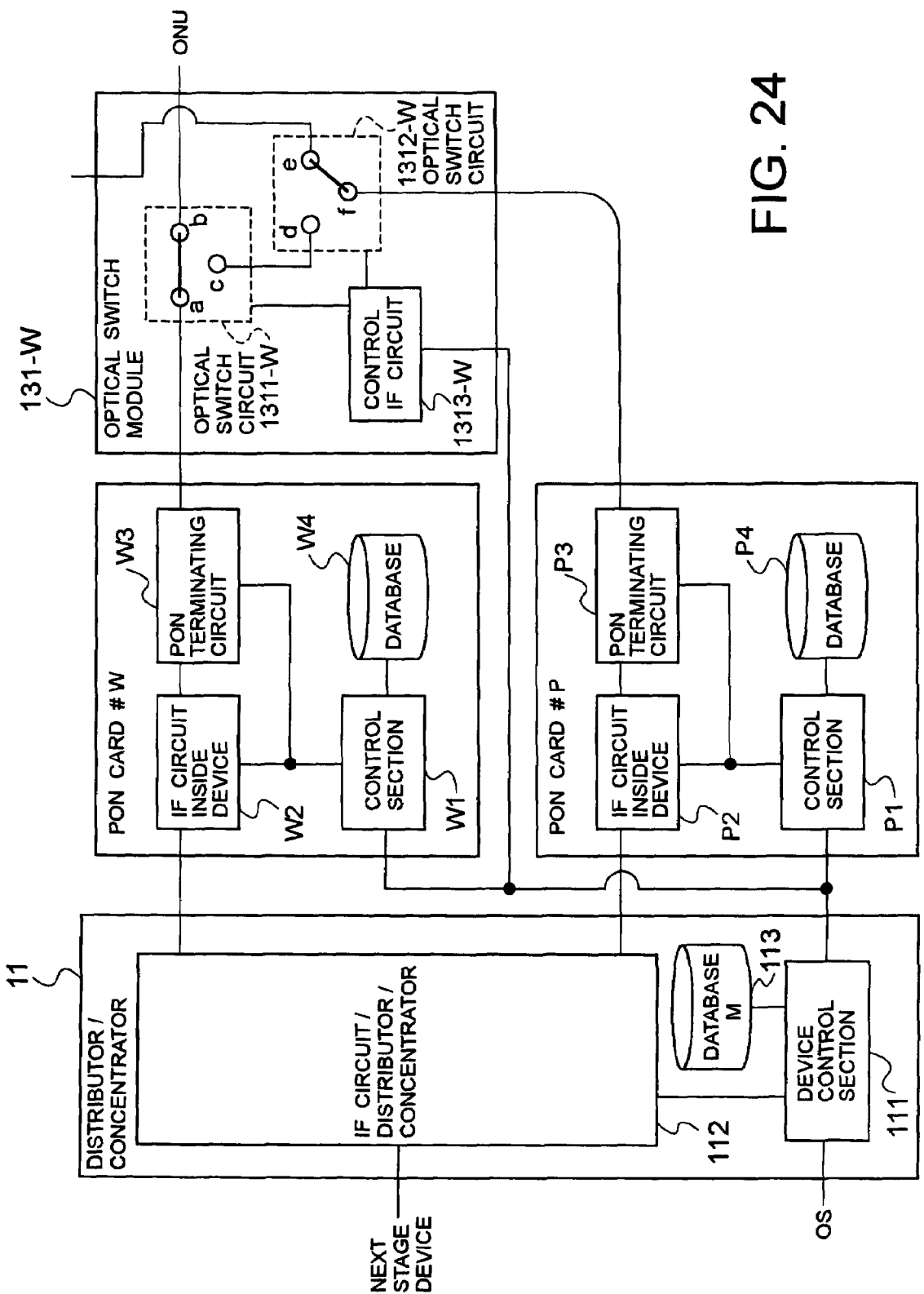
FIG. 24 is a diagram showing each function block inside the OLT shown in FIG. 17 and FIG. 18.
Figure 25:
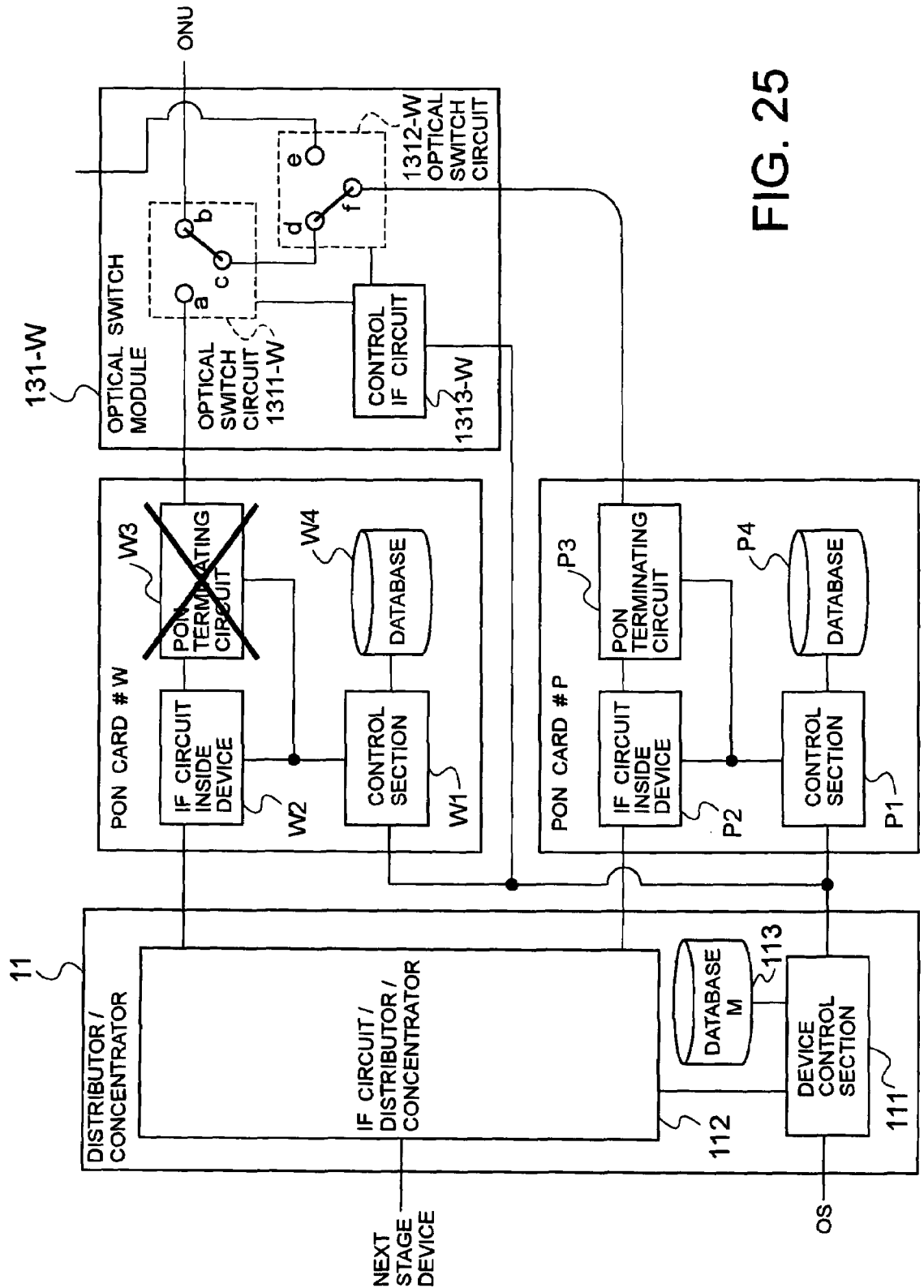
FIG. 25 is a diagram showing each function block inside the OLT shown in FIG. 17 and FIG. 18.

Each of FIG. 24 and FIG. 25 is a diagram showing each function block inside the OLT 1a shown in FIG. 17 and FIG. 18. For simplicity of the description, only one PON card for current use and one standby PON card (PON card #W and PON card #P) are shown. FIG. 24 shows a case where the PON card for current use #W is being connected. FIG. 25 shows a case where the standby PON card #P is being connected.

To the distributor/concentrator 11, the main signal interface (IF) circuit/concentrating/distributing circuit with outside 112, the device control section 111 and the device database (memory) 113 are mounted. To the PON cards #W and #P, the PON terminating circuits W3 and P3, the interface (IF) circuits inside device W2 and P2, the control sections W1 and P1 and databases (memory) W4 and P4 are mounted. To the optical switch module 131-W, the two optical switch circuits 1311-W and 1312-W and the control interface (IF) circuit 1313-W are mounted.

The device control section 111 of the distributor/concentrator 11 is connected to controlling sections W1 and P1 and a control interface circuit 1313-W of each section via control signal lines. The device control section 111 and the control sections W1 and P1 are connected with the device interface 113, the databases W4 and P4. The device database 113 of the distributor/concentrator 11 stores setting information of the entire device, setting information of each section and control information of the PON. The databases W4 and P4 of the PON cards #W and #P only store setting information and control information relating to operations of the PON cards #W and #P. In the M:N redundant configuration, M (the number of standbys) can take any integer value from 0 (without redundant) to N−1 (only one for current use).

A redundant method of the PON system according to the third exemplary embodiment of the present invention will be described with reference to FIG. 24 and FIG. 25. In FIG. 24, the PON card for current use #W is connected to the PON network (ONU) via the optical switch module 131W when the system starts up. When the OLT 1a performs startup in this condition, delay times to and from respective ONUs are measured, and the measurements are stored in the database W4 of the PON card #W and the device database 113 of the distributor/concentrator 11 as control information, respectively.

Each of the database W4 of the PON card #W and the device database 113 of the distributor/concentrator 11 stores various types of setting information for controlling the PON network. Those types of information include information on priorities of the ONU 3-1 to 3-3N, an allocated band to each flow and the like. Additionally, the device database 113 of the distributor/concentrator 11 also stores priorities of a plurality of PON cards #1 to #N. The setting information can be set and changed via the device control section 111 from an external OS.

A standby PON card #P is not connected to any of the PON networks. To the database P4 of the standby PON card #P, information on the first PON card for current use to the M$^{th}$ PON card is written as a default. FIG. 24 shows only one PON card for current use (PON card #W) to simplify the description, though, it is assumed that there are actually N PON cards for current use (PON cards #1 to #N) and M standby PON cards (PON cards #P1 to #PM) as shown in FIG. 17, being numbered from the first to the N$^{th}$ and the first to the M$^{th}$.

Assuming that a PON card for current use #W happens to have a failure in the state as shown in FIG. 25. When the device control section 111 detects the failure, it performs switching in the procedure below. First, the device control section 111 sets the database information of the failed PON card for current use #W to the first standby PON card #P, while writing it in the database W4 of the PON card #W.

As the device database 113 of the distributor/concentrator 11 includes the above-mentioned information, the device control section 111 reads the information and writes it in the database P4 of the standby PON card #P. Here, it is assumed that a value of an adjusted optical channel length inside the device of the OLT 1a (a value with a delay due to the channel length inside the device added) is set and written for the delay time to and from information of the PON.

This is because a delay due to an optical channel length inside the device cannot be ignored in an ultra-high speed PON. For example, if the uplink rate is 1 giga-bit/sec, 1 bit corresponds to 1 nano-sec, which corresponds to about 20 cm of an optical fiber. As the optical switch modules 131-j (i=1, . . . , N, j=1, . . . , M) are connected in a vertical/horizontal matrix in the exemplary embodiment, optical channel lengths differ depending on which of the PON cards for current use is connected with which of the standby PON cards. Therefore, the device control section 111 adjusts a delay due to an optical channel length that changes depending on which of the PON card for current use is connected with which of the standby PON card.

After the PON cards #W1 to #WN, #P1 to PM and the databases are set, the device control section 111 switches the optical switch circuits 1311-W and 1312-W via the control interface circuit 1313-W. FIG. 25 shows the state of the optical switch circuits 1311-W and 1312-W after the above-mentioned switching.

The above-mentioned procedure enables the standby PON card #P to immediately start communication with the ONUs 3-1 to 3-3N, omitting the initial startup of measuring a delay time to and from for the connected PON network.

If an OS changes setting information or control information of the PON changes according to a change in the state of the network while the circuits are switched, the new information is stored in both of the database P4 and the device database 113.

Assuming that the second failure occurs in another PON interface section for current use. In such a case, the line is relieved in the same manner as mentioned above to switch to the second standby PON card #P2. In the same manner, the line can be relieved by the switching, up to M PON cards for current use have failures.

Also, if the standby PON card currently being used had a failure, a line can be relieved by switching a switch and transferring a signal to vacant standby PON card when there is a vacant standby PON card.

Now, a switchback procedure in the case where the failed PON card for current use #W is changed and the operation is recovered will be described. To the newly exchanged/replaced PON card for current use #W, information based on the device database 113 is set from the device control section 11, while the same information is set to the database W4.

Thereafter, the device control section 111 connects an external network to the PON card for current use #W by switching the optical switch circuits 1311-W and 1312-W via the control interface circuit 1313-W. Then, the device control section 111 sets default information (the same information as that on the first PON card for current use #1) to the standby PON card #P and also writes the information in the database P4.

If switching is performed in response to a switching command from an OS, the same procedure as that mentioned above follows except that a failure detecting process is omitted from the above-mentioned procedure. As for switch back, the same procedure described above is applied.

Each of the PON networks can be prioritized. If a plurality of PON cards for current use have failures at the same time, the device control section 111 controls to switch the PON network with the higher priority to the standby PON card. In the M:N redundant configuration, M (the number of standbys) can take any integer value from 0 (without redundant) to N−1 (only one for a card for current use). By increasing or decreasing the optical switches, the standbys can be increased or decreased, or the ratio between the PON cards for current use and the standby PON cards can be changed. That is referred to as a configuration change.

In this state, by increasing or decreasing the optical switches while switching or switchback being performed, the configuration change can be performed without stopping the service except for an instantaneous interruption of a signal.

As an example, a procedure of the configuration change from 1:N redundant to 2:N redundant is exemplified in FIG. 26 to FIG. 36 in chronological order.

Each of FIG. 26 to FIG. 36 is a diagram showing a procedure of a configuration change from 1:N redundant to 2:N redundant in the third exemplary embodiment of the present invention. The procedure of the configuration change from 1:N redundant to 2:N redundant will be described with reference to FIG. 26 to FIG. 36.

Figure 26:
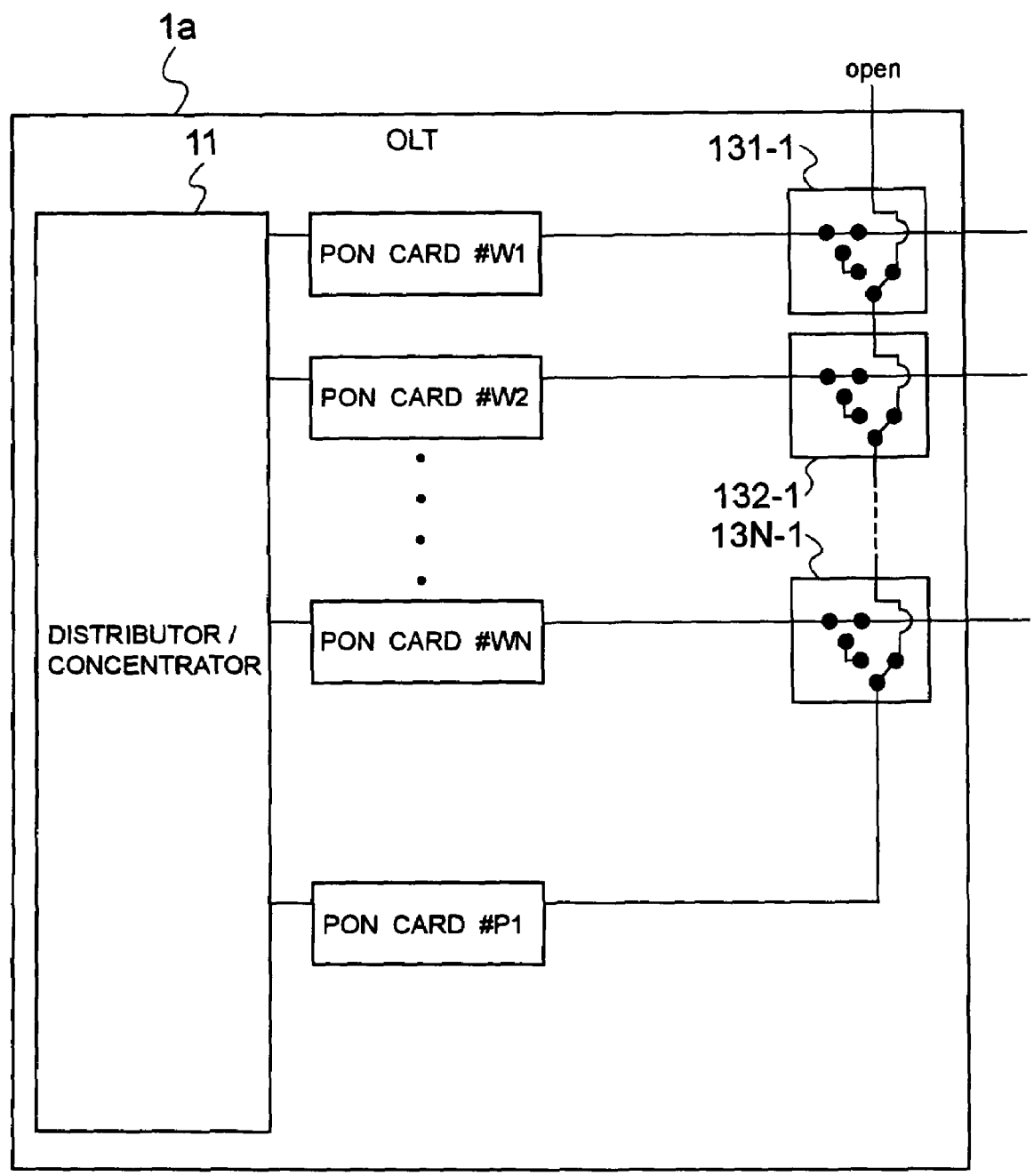
FIG. 26 is a diagram showing a procedure of a configuration change from 1:N redundant to 2:N redundant in the third exemplary embodiment of the present invention.

FIG. 26 shows an initial state where the PON cards for current use #W to #WN and the standby PON card #P1 can be switched or switched back by the switch modules 131-1 to 13N-1.

Figure 27:
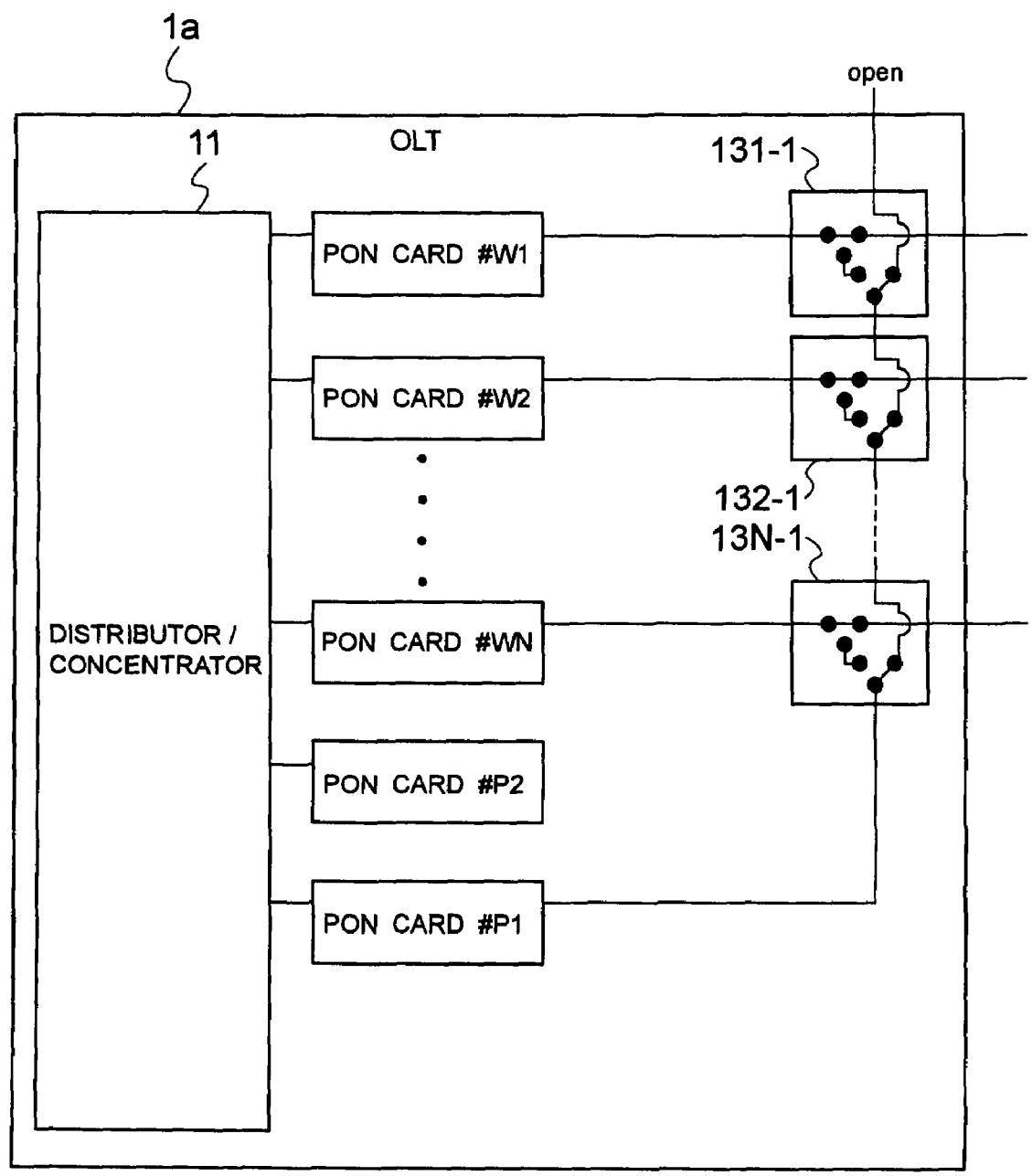
FIG. 27 is a diagram showing a procedure of a configuration change from 1:N redundant to 2:N redundant in the third exemplary embodiment of the present invention.
Figure 28:
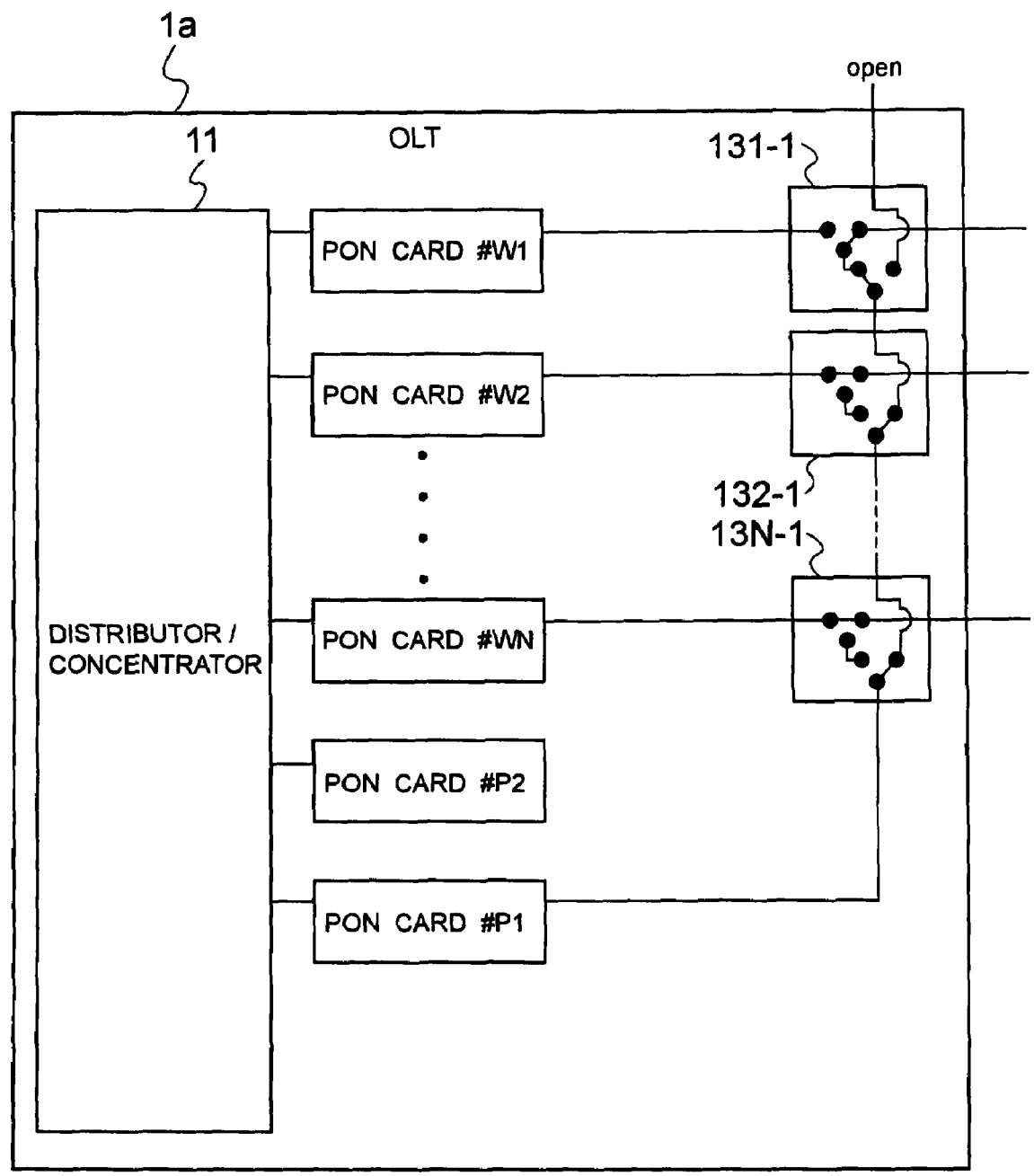
FIG. 28 is a diagram showing a procedure of a configuration change from 1:N redundant to 2:N redundant in the third exemplary embodiment of the present invention.
Figure 29:
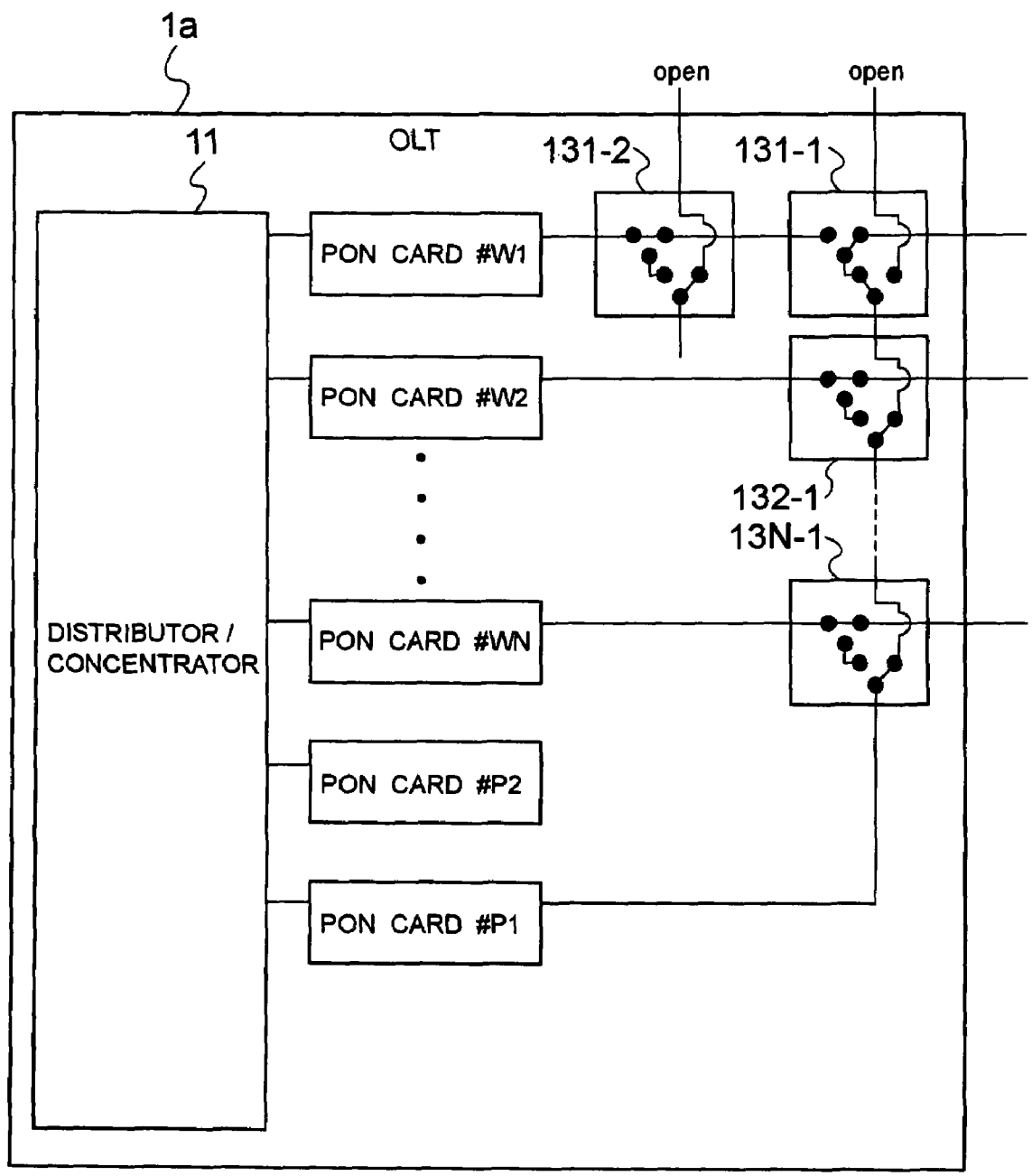
FIG. 29 is a diagram showing a procedure of a configuration change from 1:N redundant to 2:N redundant in the third exemplary embodiment of the present invention.
Figure 30:
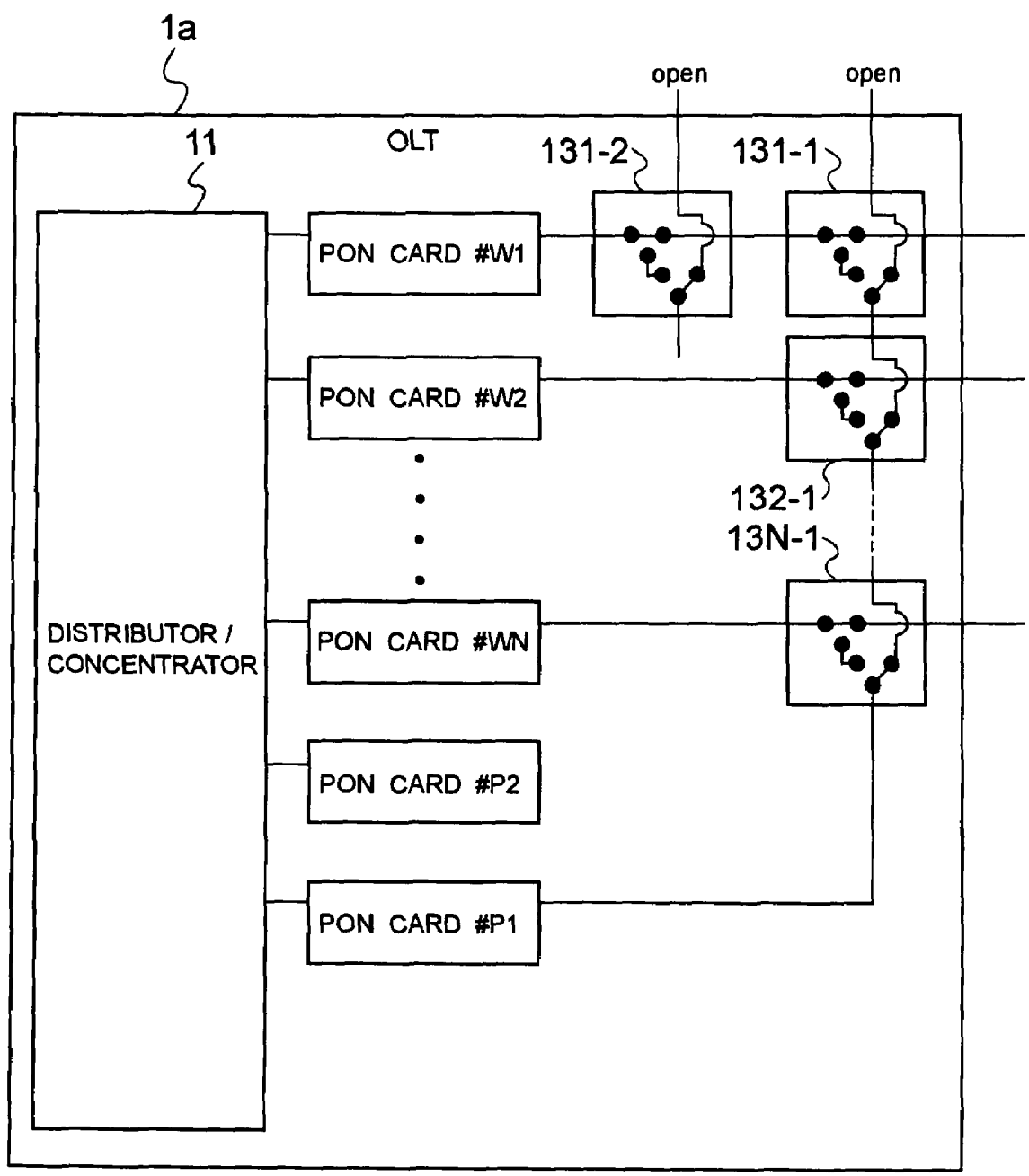
FIG. 30 is a diagram showing a procedure of a configuration change from 1:N redundant to 2:N redundant in the third exemplary embodiment of the present invention.

FIG. 27 shows a case where the second standby PON card (PON card #P2) is added. FIG. 28 shows a case where current use (PON card #W1) is switched to a standby (PON card #P1). FIG. 29 shows a case where the optical switch module 131-2 is inserted into the first PON card for current use #W1. FIG. 30 shows a case where the first PON card for current use #W1 is switched back for current use.

Figure 31:
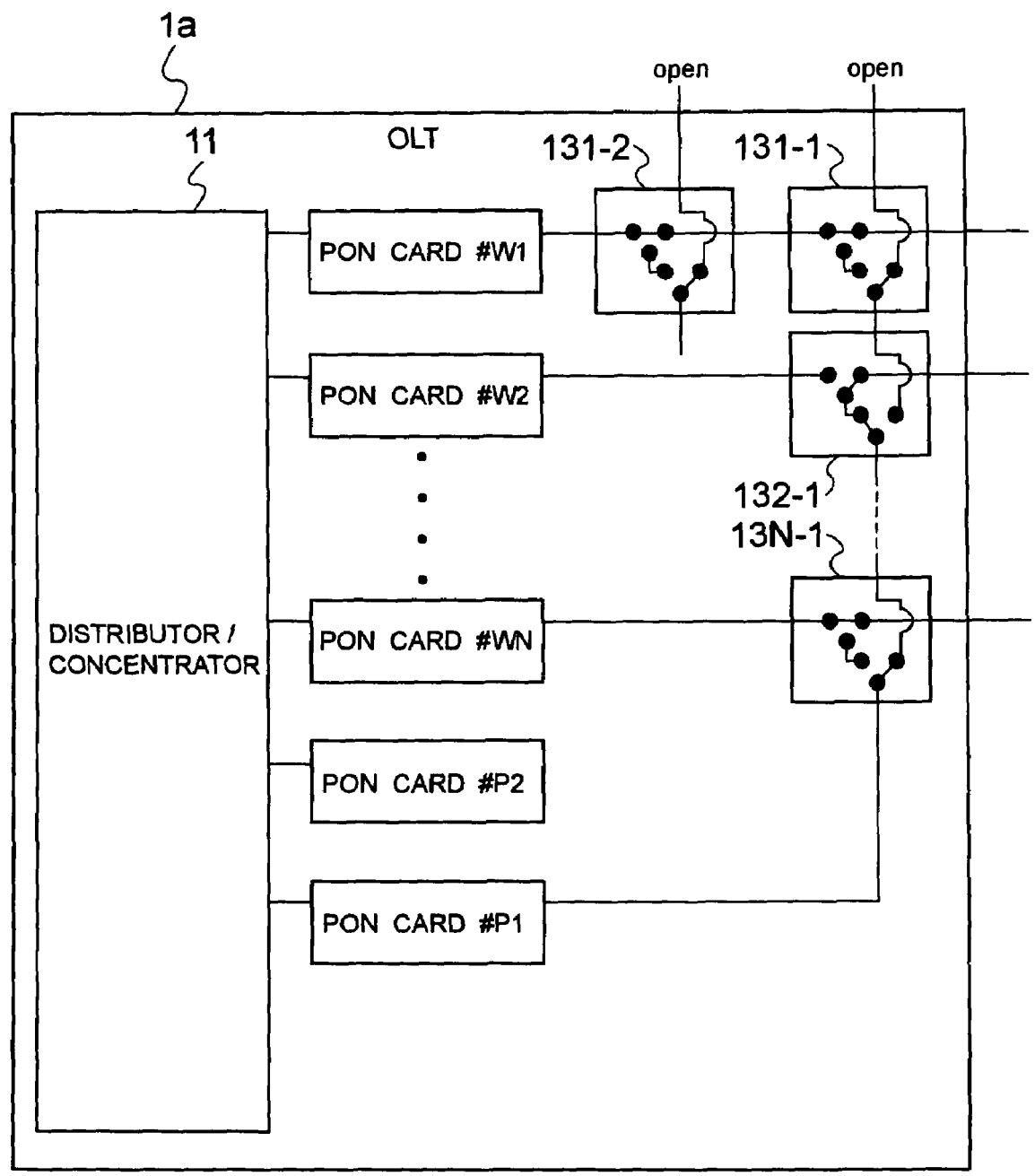
FIG. 31 is a diagram showing a procedure of a configuration change from 1:N redundant to 2:N redundant in the third exemplary embodiment of the present invention.
Figure 32:
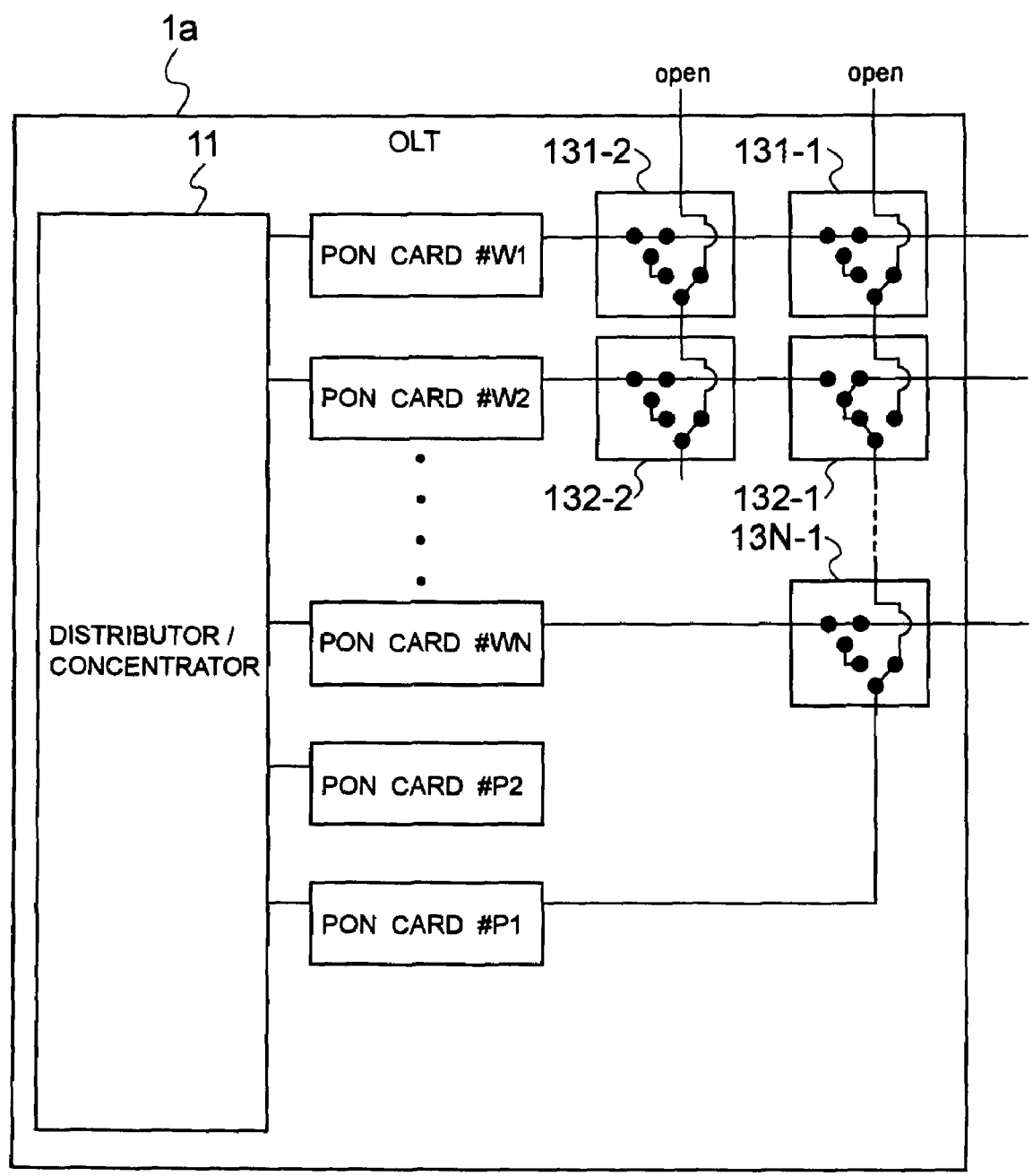
FIG. 32 is a diagram showing a procedure of a configuration change from 1:N redundant to 2:N redundant in the third exemplary embodiment of the present invention.
Figure 33:
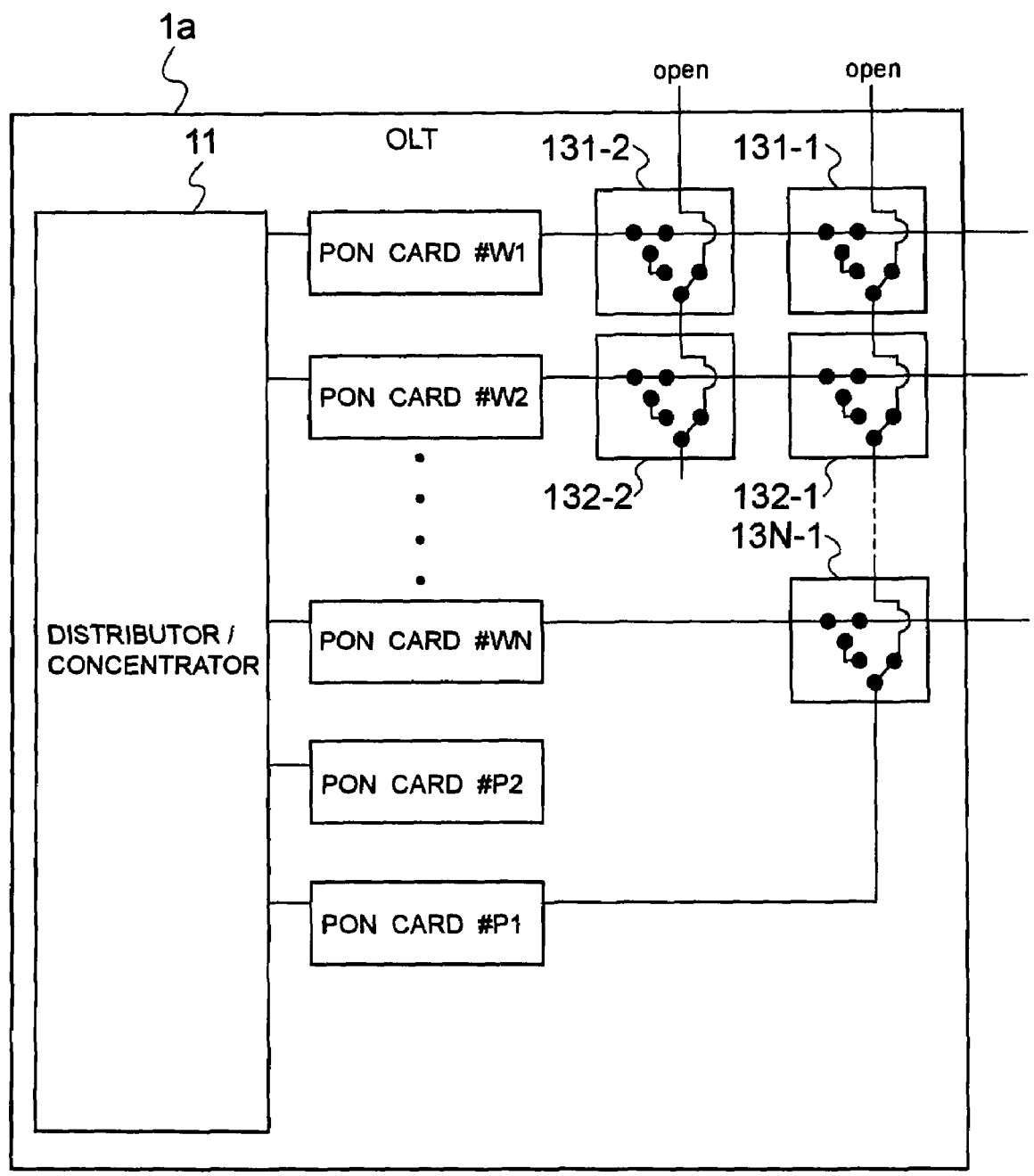
FIG. 33 is a diagram showing a procedure of a configuration change from 1:N redundant to 2:N redundant in the third exemplary embodiment of the present invention.

FIG. 31 shows a case where the second PON card #W2 is switched to the standby (PON card #P1). FIG. 32 shows a case where the optical switch module 132-2 is inserted into the second PON card for current use #W2. FIG. 33 shows a case where the second PON card for current use #W2 is switched back to the current use. The same procedure is repeated to the N−1$^{th}$ of the current use.

Figure 34:
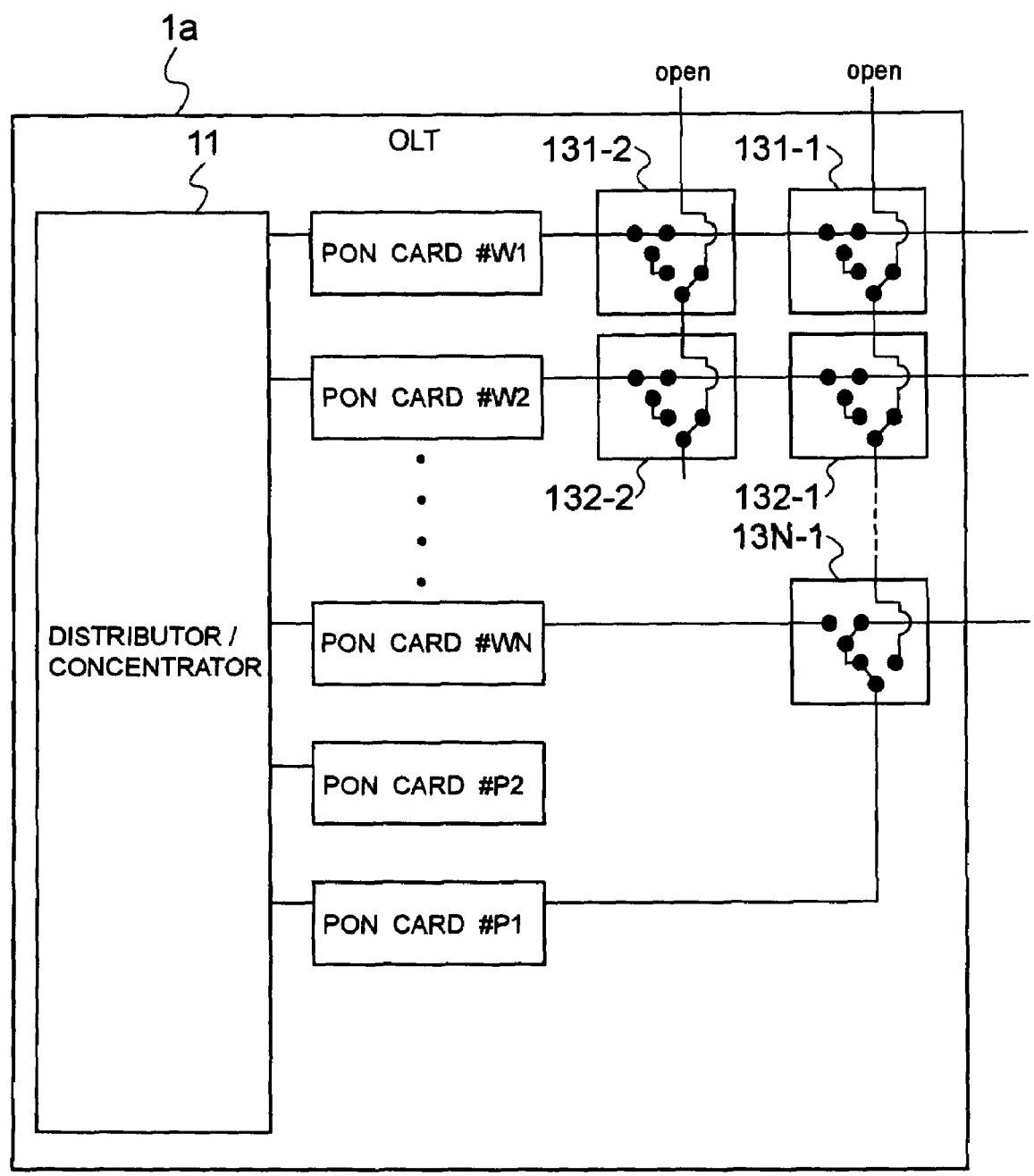
FIG. 34 is a diagram showing a procedure of a configuration change from 1:N redundant to 2:N redundant in the third exemplary embodiment of the present invention.
Figure 35:
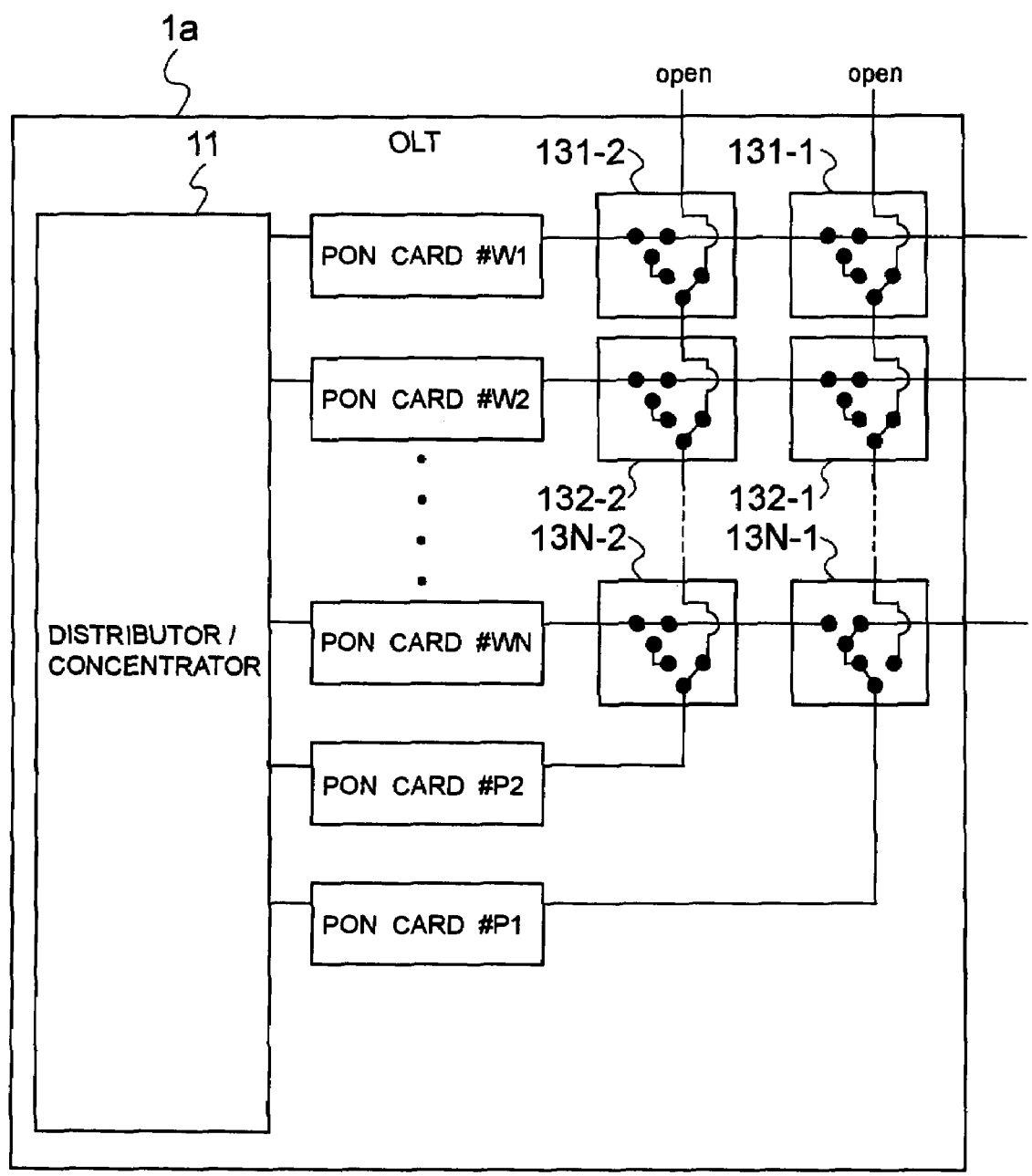
FIG. 35 is a diagram showing a procedure of a configuration change from 1:N redundant to 2:N redundant in the third exemplary embodiment of the present invention.
Figure 36:
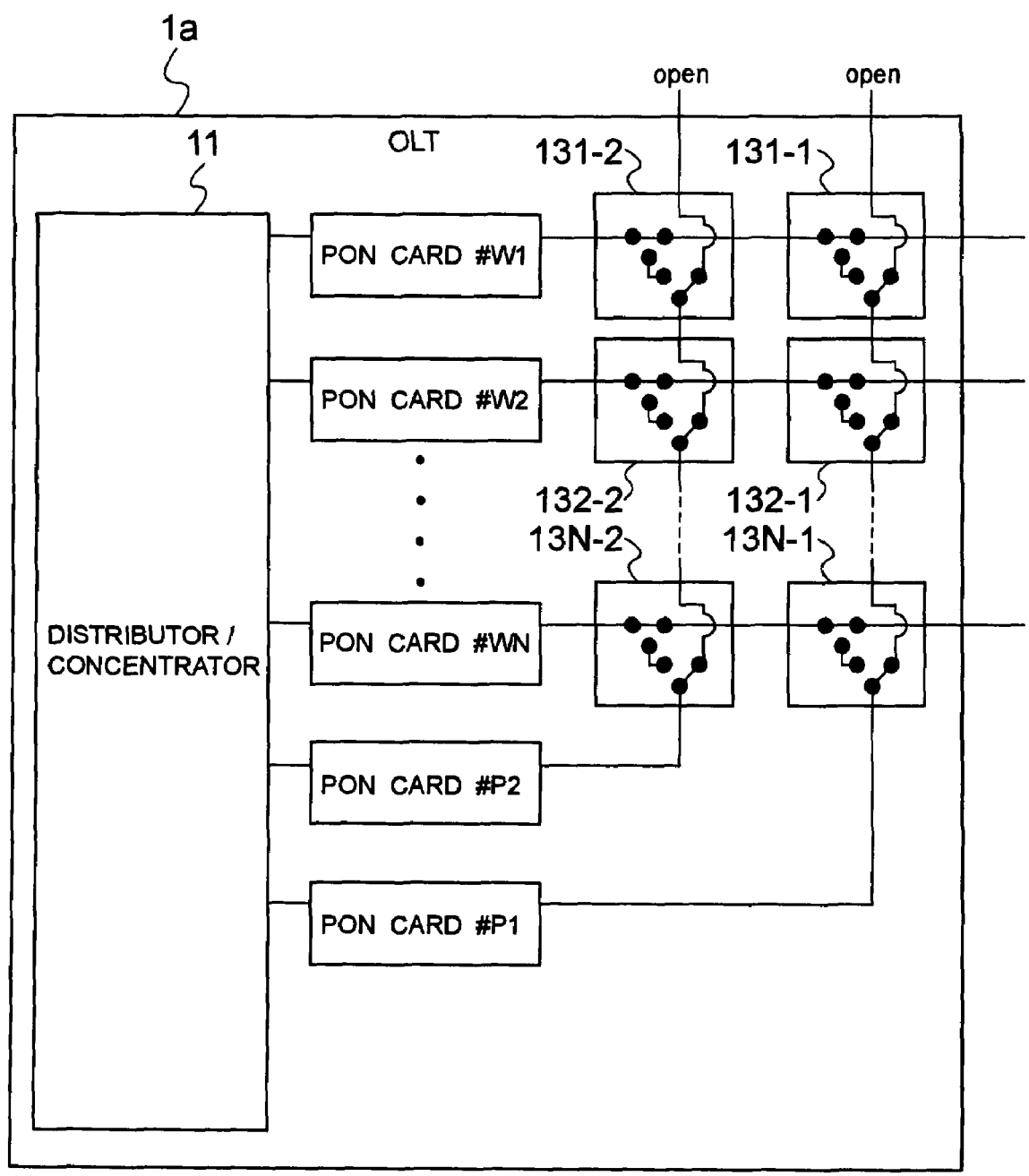
FIG. 36 is a diagram showing a procedure of a configuration change from 1:N redundant to 2:N redundant in the third exemplary embodiment of the present invention.
Figure 37:
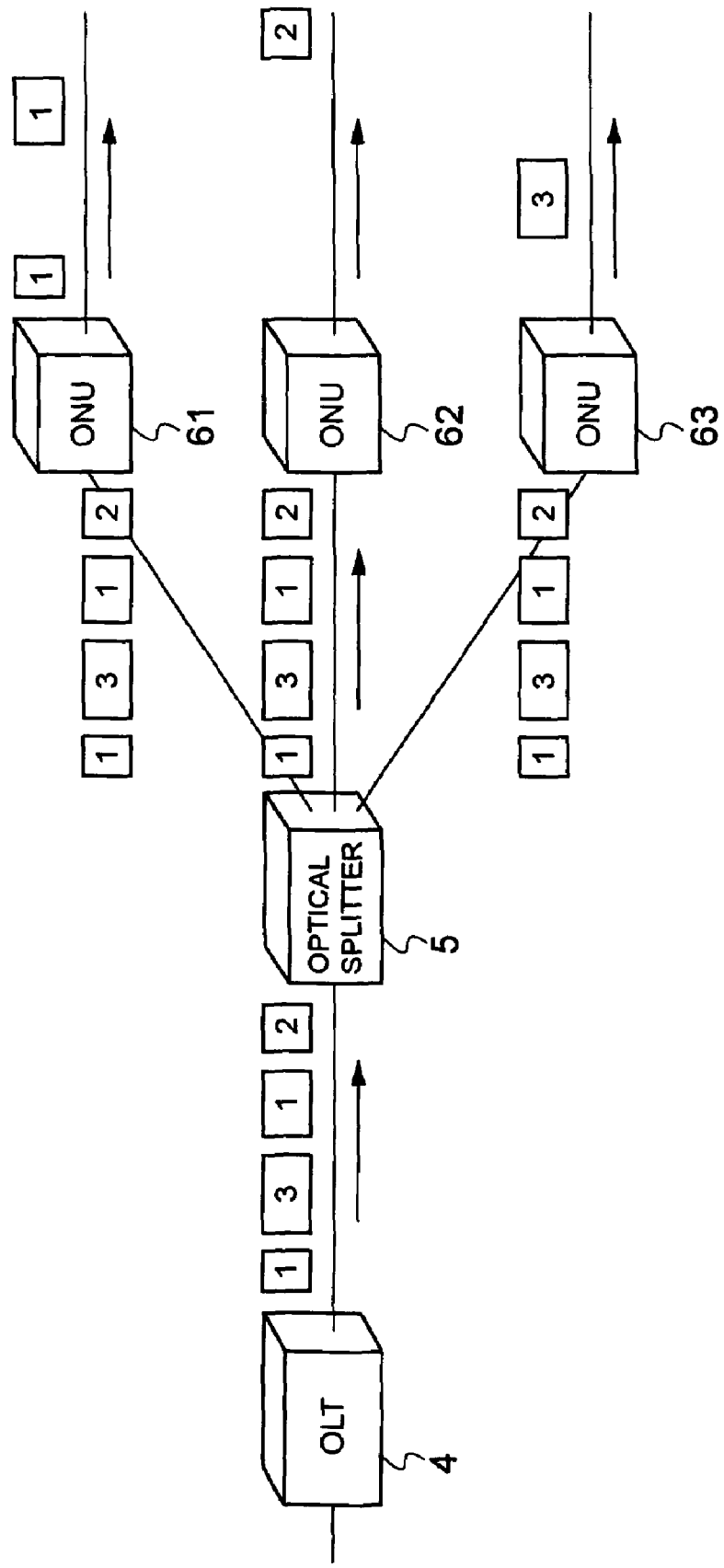
FIG. 37 is a diagram showing a basic configuration of a conventional PON system.
Figure 38:
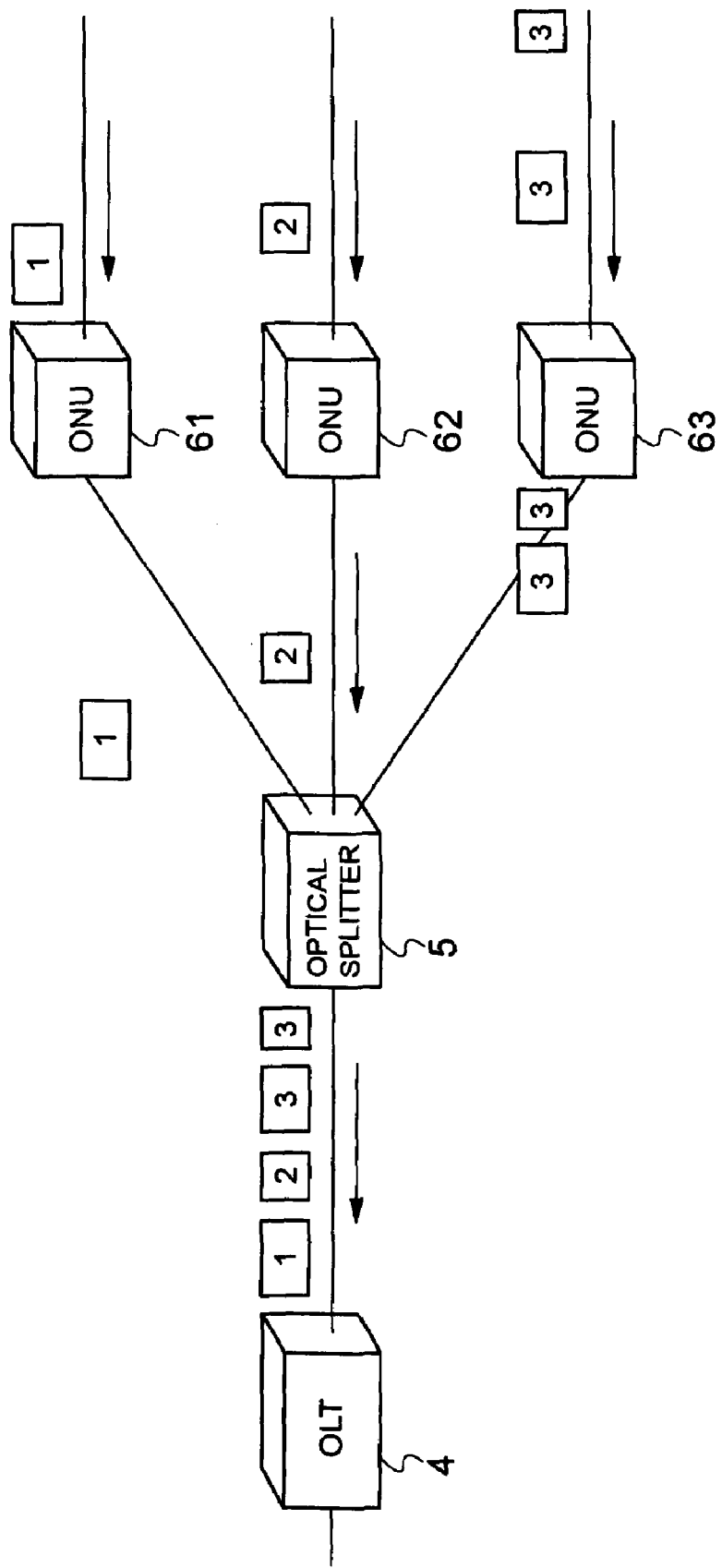
FIG. 38 is a diagram showing a basic configuration of a conventional PON system.
Figure 39:
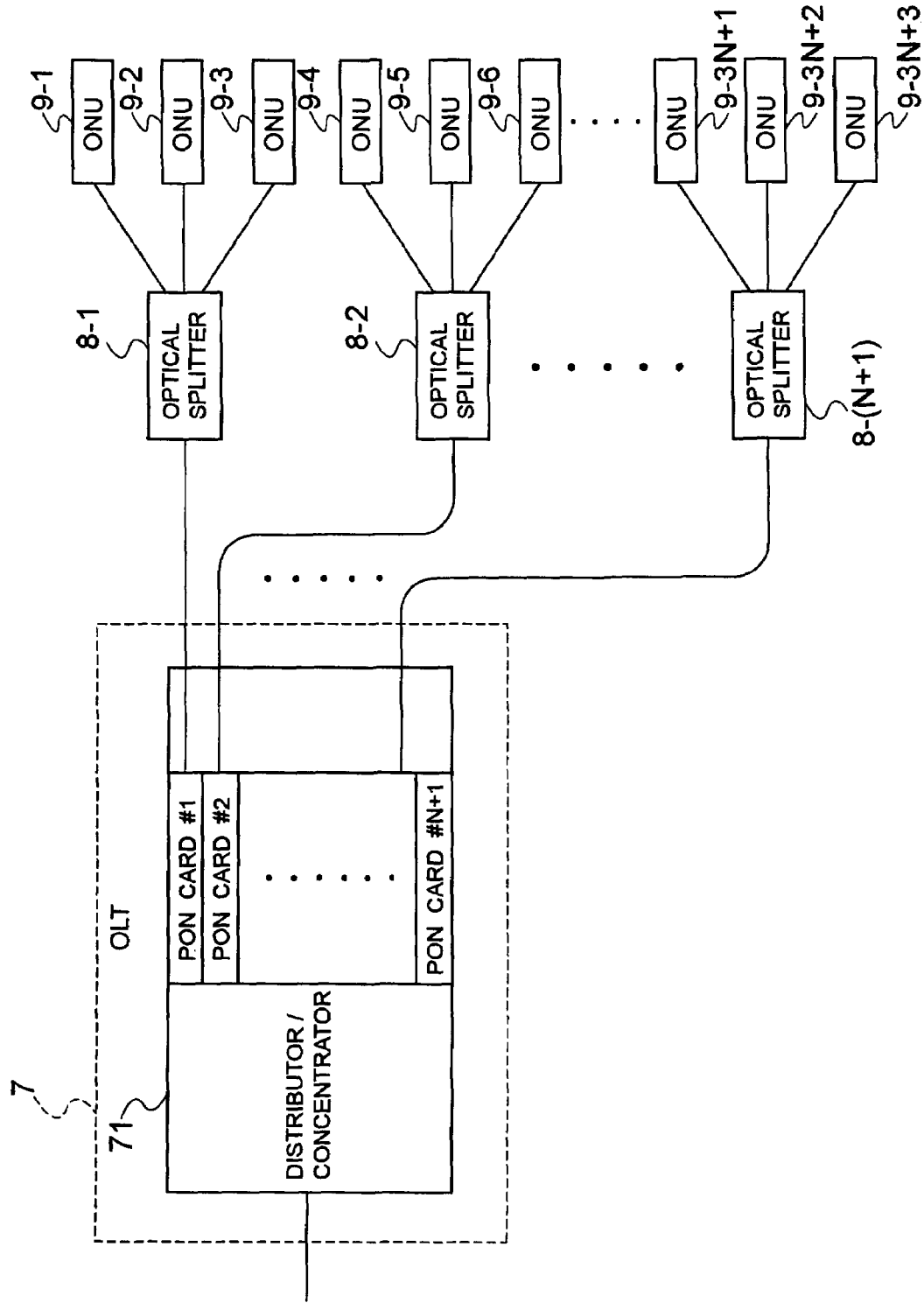
FIG. 39 is a diagram showing an example of a configuration of a conventional OLT.
Figure 40:
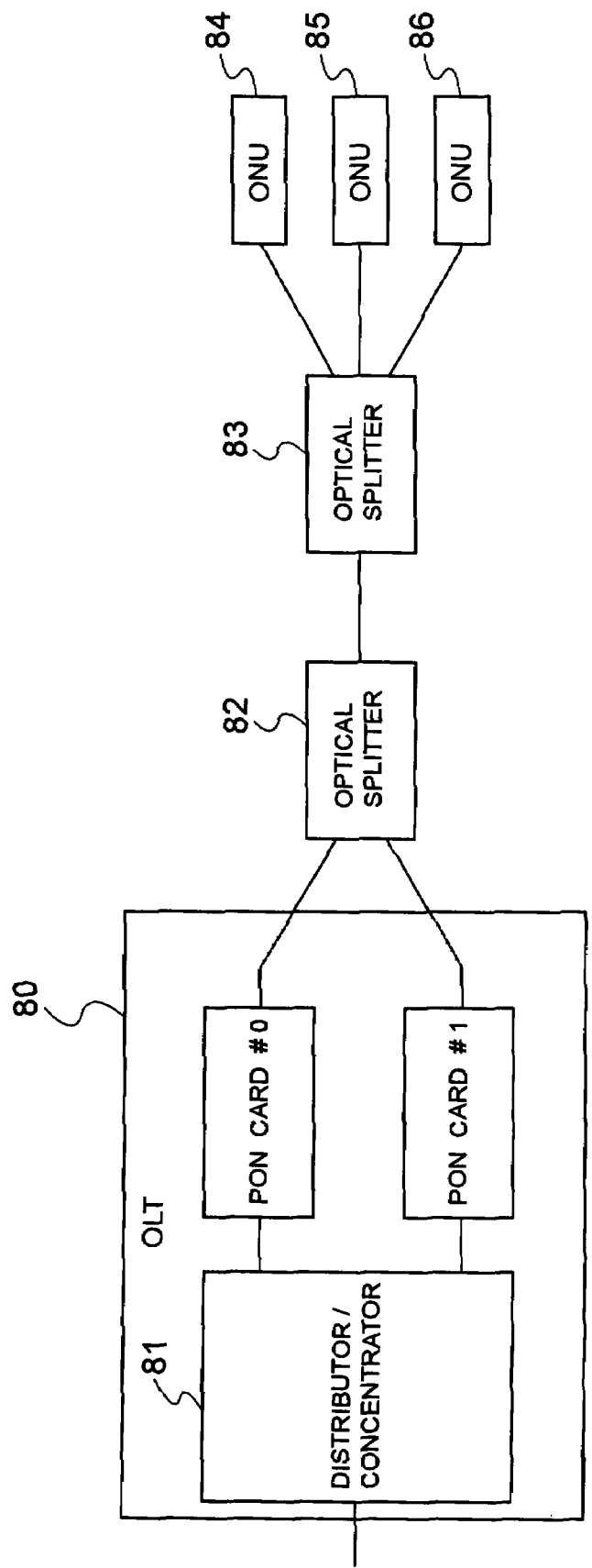
FIG. 40 is a diagram showing another example of a configuration of a conventional OLT.
Figure 41:
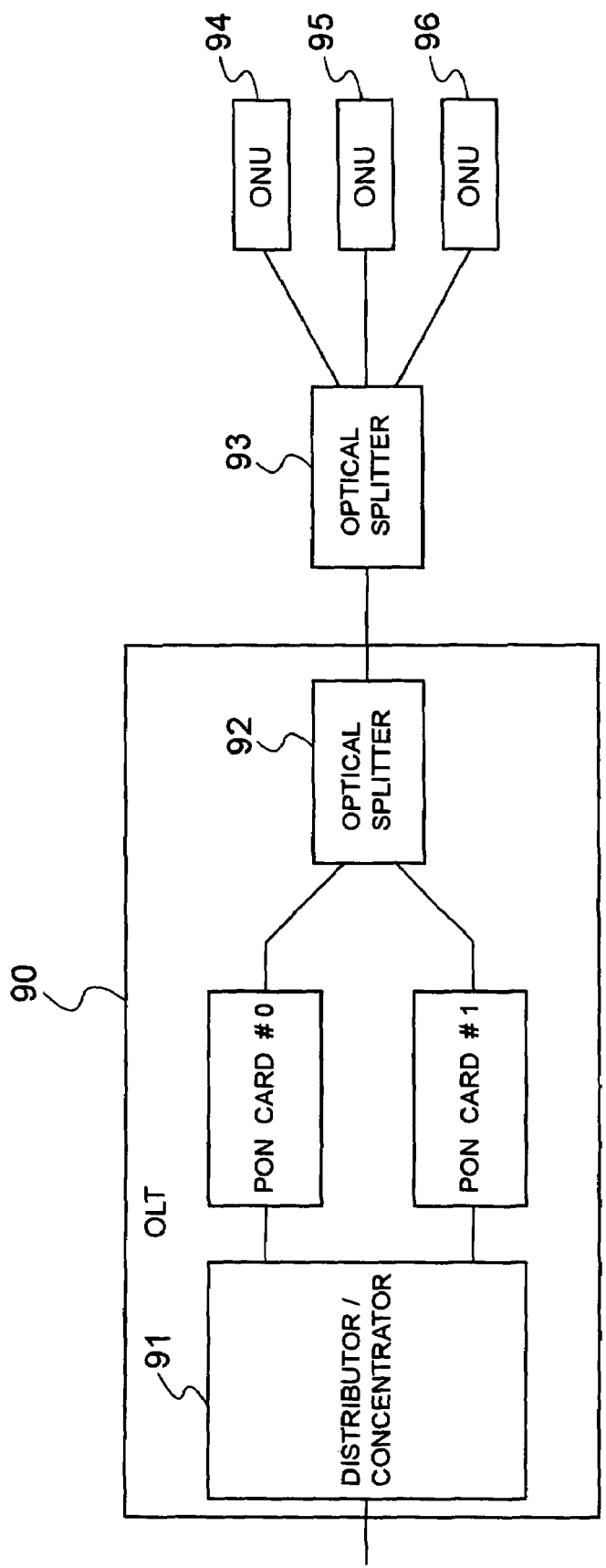
FIG. 41 is a diagram showing another example of a configuration of a conventional OLT.

FIG. 34 shows a case where the N$^{th}$ PON card for current use #WN is switched to the standby (PON card #P1). FIG. 35 shows a case where the optical switch module 13N−2 is inserted into the N$^{th}$ PON card for current use. FIG. 36 shows a case where the N$^{th}$ PON card for current use #WN is switched back. With this operation, the above-mentioned configuration change is completed.

As such, unlike the conventional 1+1 redundant, in the exemplary embodiment, redundant can be realized without significantly increasing volume of the station side device and without significantly decreasing the number of accommodating lines. Accordingly, an economical and highly reliable PON system can be built. Also in the exemplary embodiment, the standby takes over the setting/control information on the current use with a delay due to an optical channel length inside a device considered when it performs switching. That enables the initial startup of the PON to be eliminated, a time for switching to be shortened and signal conduction to be rapidly realized.

Also in the exemplary embodiment, with a configuration using an optical switch, advantages of reducing optical power loss more than by a conventional configuration with an optical branch and decreasing the restriction on a distance are achieved. Also in the exemplary embodiment, with a plurality of standbys, a plurality of failures up to M can be addressed and more reliable system can be built. In this state in the exemplary embodiment, by increasing or decreasing the optical switches while switching or switchback being performed, the redundant configuration can be changed without stopping the service except for an instantaneous interruption of a signal.

Exemplary Embodiment 4

Fourth exemplary embodiment of the present invention is a station side device including a plurality of PON interface sections, connected to a plurality of house devices set in each end user's house via a plurality of PONs (passive optical network) and a concentrating/distributing section for accommodating the plurality of PONs and concentrating and distributing signals via the plurality of PON interface sections; including:

N (N is a positive integer) optical switch modules, each of which is connected to a PON interface section for current use among the plurality of PONs, realizing 1:N redundant of the PONs by cascading the N optical switch modules.

Exemplary Embodiment 5

Fifth exemplary embodiment of the present invention is a station side device including a plurality of PON interface sections connected to a plurality of house devices set in each end user's house via a plurality of PONs (passive optical network) and a concentrating/distributing section for accommodating the plurality of PONs and concentrating and distributing signals via the plurality of PON interface sections; including:

N (N is a positive integer) 2:1 optical switches, each of which is connected to a PON interface section for current use among the plurality of PONs and an N:1 optical switch which is connected to a standby PON interface section among the plurality of PONs, realizing 1:N redundant of the PONs by using the N 2:1 optical switches and the N:1 optical switch.

Exemplary Embodiment 6

Sixth exemplary embodiment of the present invention is a redundant method used in a PON system including a plurality of PONs (passive optical network), a plurality of house devices set in an end user's house, and a station side device including a plurality of PON interface sections connected to the house devices via the plurality of PONs, and a concentrating/distributing section for accommodating the plurality of PONs and concentrating and distributing signals via the plurality of PON interface sections; including in the station side device:

realizing 1:N redundant of the PONs by cascading the N (N is a positive integer) optical switch modules, each of which is connected to a PON interface section for current use among the plurality of PONs.

Exemplary Embodiment 7

Seventh exemplary embodiment of the present invention is a redundant method used in a PON system including a plurality of PONs (passive optical network), a plurality of house devices set in an end user's house, and a station side device including a plurality of PON interface sections connected to the house devices via the plurality of PONs, and a concentrating/distributing section for accommodating the plurality of PONs and concentrating and distributing signals via the plurality of PON interface sections; including in the station side device:

realizing 1:N redundant of the PONs by using N (N is a positive integer) 2:1 optical switches, each of which is connected to a PON interface section for current use among the plurality of PONs, and an N:1 optical switch, which is connected to a standby PON interface section among the plurality of PONs in the station side device.

Exemplary Embodiment 8

Eighth exemplary embodiment of the present invention is a station side device including a plurality of PON interface sections connected to a plurality of house devices set in each end user's house via a plurality of PONs (passive optical network) and a concentrating/distributing section for accommodating the plurality of PONs and concentrating and distributing signals via the plurality of PON interface sections; including:

M×N (N is a positive integer) optical switch modules connected to a PON interface section for current use among the plurality of PONs, in which M (M is 0 or a positive integer) PON interface sections are allocated among said plurality of PON interfaces to standby, realizing M:N redundant of the PONs by connecting the M×N optical switch modules in matrices.

Exemplary Embodiment 9

Ninth exemplary embodiment of the present invention is a redundant method used in a PON system including a plurality of PONs (passive optical network), a plurality of house devices set in an end user's house, and a station side device including a plurality of PON interface sections connected to the house devices via the plurality of PONs, and a concentrating/distributing section for accommodating the plurality of PONs and concentrating and distributing signals via the plurality of PON interface sections; including in the station side device:

realizing M:N redundant of the PONs by connecting the M×N (N is a positive integer) optical switch modules, each of which is connected to a PON interface section for current use among the plurality of PONs, in which M (M is 0 or a positive integer) PON interface sections among the plurality of PON interfaces are allocated to standby.

Exemplary Embodiment 10

Tenth exemplary embodiment of the present invention is a redundant method of the PON (passive optical network) system which provides a method of configuring an economical and highly reliable PON system by causing the station side device to realize 1:N (N is a positive integer) redundant.

Exemplary Embodiment 11

Eleventh exemplary embodiment of the present invention is a PON system which can realize an economical and highly reliable PON system by performing 1:N redundant of PON cards (PON interface section) in a simple method at an OLT (optical line terminator: station side device).

Exemplary Embodiment 12

Twelfth exemplary embodiment of the present invention is a PON system which realizes 1:N redundant of PONs by cascading N optical switch modules. Unlike the conventional 1+1 redundant, the above described PON system enables the PON system of the present invention to realize redundant without significantly increasing volume of the station side device and significantly decreasing the number of accommodating lines. Accordingly, an economical and highly reliable PON system can be built.

Exemplary Embodiment 13

Thirteenth exemplary embodiment of the present invention is setting/controlling information on the PON which is taken over from the current use to the standby as optical channel examination inside the station side device is adjusted, when the PON system of the present invention switches the PON interface section from one for current use to one for standby.

Accordingly, in the PON system of the present invention, the standby PON interface takes over the setting/controlling information of the PON interface for current use with a delay due to an optical channel length inside the station side device added when they are switched. That enables the initial startup of the PON to be eliminated, a time for switching the interfaces to be shortened and signal conduction to be rapidly realized.

Exemplary Embodiment 14

Fourteenth exemplary embodiment of the present invention is a PON system which realizes 1:N redundant of the PONs by using N 2:1 optical switches and an N:1 optical switch. Accordingly, the PON system of the present invention is configured with the optical switches so that it can reduce optical power loss more than a conventional configuration with an optical branch does and decrease the restriction on a distance.

Exemplary Embodiment 15

Fifteenth exemplary embodiment of the present invention is N PON networks which may be prioritized so that switching is performed from the PON network in the highest priority in the case of failure.

Exemplary Embodiment 16

Sixteenth exemplary embodiment of the present invention is a redundant method of the PON system which provides a method for configuring an economical and highly reliable PON system by realizing redundant of M:N (M and N are positive integers) at the station side device.

Exemplary Embodiment 17

Seventeenth exemplary embodiment of the present invention is a PON system which realizes a M:N redundant configuration of the station side device (OLT) by allocating M PON interface sections among the PON interface sections to standby and connecting any one of N PON networks to each of the PON interface sections via an optical switch at the station side device (OLT). Here, the PON network refers to an optical network outside the OLT device, i.e., the whole of an optical fiber, an optical branch/coupling device and ONUs, which are subsequently connected with them.

Exemplary Embodiment 18

Eighteenth exemplary embodiment of the present invention is a redundant method of other PON system which enables redundant without significantly increasing volume of the station side device and significantly decreasing the number of accommodating lines, unlike the conventional 1+1 redundant. Accordingly, an economical and highly reliable PON system can be built.

Exemplary Embodiment 19

Nineteenth exemplary embodiment of the present invention is a redundant method of other PON system in which the standby PON interface takes over the setting/controlling information of the PON interface for current use with a delay due to an optical channel length inside the station side device added when they are switched. That enables the initial startup of the PON to be eliminated, a time for switching the interfaces to be shortened so that signal rapid conduction can be realized.

Exemplary Embodiment 20

Twentieth exemplary embodiment of the present invention is a redundant method of other PON system which realizes by configuring the PON system with an optical switch to reduce optical power loss more than a conventional configuration with an optical branch does and decrease the restriction on a distance.

Exemplary Embodiment 21

Twenty-first exemplary embodiment of the present invention is a redundant method of other PON system which can address a plurality of failures up to M failures so as to build more reliable system by providing a plurality of standby PON interfaces. In this case, the redundant method of the other PON system of the present invention can change a redundant configuration without stopping a service except for an instantaneous interruption of a signal by increasing or decreasing the optical switches with switching and switching back of PON interfaces.

Exemplary Embodiment 22

Twenty-second exemplary embodiment of the present invention is an invention which has an advantage of realizing an economical and highly reliable PON system with the above-mentioned configurations and operations.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A PON (passive optical network) system including a plurality N (N is a positive integer) of optical splitters, a plurality of house devices set in end users' houses, each said house device connected to one of said N optical splitters, and a station side device (optical line terminator, OLT) including a plurality M+N (M is a positive integer) of PON cards in a PON interface section connected to said house devices via said plurality N of optical splitters, and a concentrating/distributing section for accommodating said plurality N of optical splitters and concentrating and distributing signals via said plurality of PON cards in said interface section, said PON system comprising, in said station side device:

M×N optical switch modules connected to an output of said PON interface section for current use among said plurality N of optical splitters, the PON interface section for current use including N of said M+N PON cards designated as current use PON interface cards, and M PON cards in said PON interface section among said plurality M+N of PON cards are allocated to standby in said station side device, realizing an M:N redundancy of said PON cards by connecting said M×N optical switch modules in matrices, such that said M×N optical switch modules permit any one of the M standby PON cards in the PON interface section to selectively be connected to any of the N optical splitters, wherein said station side device causes setting/controlling information of said PON card to be taken over from a PON card in the PON interface section for current use to a standby PON card by adjusting an optical channel delay inside the standby PON card when said optical switch module performs switching.

2. The PON system according to claim 1, wherein said M standby PON cards are prioritized, and when a failure occurs, switching starts from a PON card with a highest priority.

3. The PON system according to claim 1, wherein a configuration change of said station side device is performed as said optical switch module is inserted after said PON card for current use is switched to said standby PON card, and then, an operation of switching back the PON for current use is performed on N PON cards for current use in order.

4. The PON system of claim 1, wherein said optical switch modules are connected to an output side of said plurality of PON cards for a purpose of achieving said redundancy.

5. A station side device including a plurality of (passive optical network) cards connected to a plurality of house devices set in end users' houses via a plurality of optical splitters and a concentrating/distributing section for accommodating said plurality of optical splitters and concentrating and distributing signals via said plurality of PON cards, said station side device comprising:

M×N (M, N are positive integers) optical switch modules connected to an output of a PON interface section containing N PON cards for current use among said plurality of PON cards, in which M PON cards are allocated among said plurality of PON cards to standby, realizing an M:N redundancy of said PONs by connecting said M×N optical switch modules in matrices, wherein any one of said M stand by PON cards can selectively be connected in place of any of said N PON cards for current use, wherein setting/controlling information is taken over from a PON card for current use to a standby PON card as an optical channel delay inside the standby PON card is adjusted when said optical switch module performs switching.

6. The station side device according to claim 5, wherein said M standby PON cards are prioritized, and when a failure occurs, switching starts from a standby PON card with a highest priority.

7. The station side device according to claim 5, wherein a configuration change is performed as said optical switch module is inserted after said PON card for current use is switched to a standby PON card, and then, an operation of switching back the PON card for current use is performed on N PON cards for current use in order.

8. A redundancy method used in a PON (passive optical network) system including a plurality of optical splitters, a plurality of house devices set in end users' houses, each said house device connected to one of said optical splitters, and a station side device including a plurality of PON cards connected to said house devices via said plurality of optical splitters, and a concentrating/distributing section for accommodating said plurality of optical splitters and concentrating and distributing signals via said plurality of PON cards, said redundancy method comprising, in said station side device:

realizing an M:N redundancy of said plurality of PON cards by connecting M×N (M, N are positive integers) optical switch modules, each of which is connected to an output of a PON interface section having N PON cards for current use among said plurality of PON cards, in which M PON cards among said plurality of PON cards are allocated to standby, such that any of said M standby PON cards can selectively be connected in place of any of said N PON cards for current use, wherein said station side device causes setting/controlling information of said PON card to be taken over from the PON interface section as a PON card for current use to a standby PON card by adjusting an optical channel delay inside the standby PON card when said optical switch module performs switching.

9. The redundant method according to claim 8, wherein said M standby PONs are prioritized, and when a failure occurs, switching starts from a PON with a highest priority.

10. The redundant method according to claim 8, wherein a configuration change of said station side device is performed as said optical switch module is inserted after said PON interface section for current use is switched to said standby PON interface section, and then, an operation of switching back the PON interface section for current use is performed on N PON interface sections for current use in order.

* * * * *